(12) United States Patent
Mochizuki et al.

(10) Patent No.: US 10,254,135 B2
(45) Date of Patent: Apr. 9, 2019

(54) CORRECTION APPARATUS AND METHOD FOR ANGLE SENSOR, AND ANGLE SENSOR

(71) Applicant: TDK CORPORATION, Tokyo (JP)

(72) Inventors: Shinichirou Mochizuki, Tokyo (JP);
Hiraku Hirabayashi, Tokyo (JP);
Hiroshi Naganuma, Tokyo (JP);
Tsuyoshi Umehara, Tokyo (JP);
Yuichiro Yamaji, Tokyo (JP)

(73) Assignee: TDK CORPORATION, Tokyo (JP)

( * ) Notice: Subject to any disclaimer, the term of this patent is extended or adjusted under 35 U.S.C. 154(b) by 197 days.

(21) Appl. No.: 15/181,904

(22) Filed: Jun. 14, 2016

(65) Prior Publication Data
US 2017/0030742 A1 Feb. 2, 2017

(30) Foreign Application Priority Data
Jul. 31, 2015 (JP) .................................. 2015-152102

(51) Int. Cl.
*G01D 5/14* (2006.01)
*G01D 5/244* (2006.01)

(52) U.S. Cl.
CPC ......... *G01D 5/24476* (2013.01); *G01D 5/145* (2013.01)

(58) Field of Classification Search
CPC ........................... G01D 5/24476; G01D 5/145
USPC .......................................................... 702/85
See application file for complete search history.

(56) References Cited

U.S. PATENT DOCUMENTS

| | | | | |
|---|---|---|---|---|
| 7,852,070 B2* | 12/2010 | Yamada | ................ | G01D 5/145 324/207.21 |
| 2006/0076480 A1* | 4/2006 | Kiriyama | ........... | G01D 5/24452 250/231.16 |
| 2011/0115477 A1* | 5/2011 | Suzuki | ................... | G01D 5/145 324/207.21 |
| 2012/0095712 A1* | 4/2012 | Komasaki | .............. | G01D 3/036 702/94 |
| 2014/0336878 A1* | 11/2014 | Yanai | ..................... | G01D 5/145 701/41 |

(Continued)

FOREIGN PATENT DOCUMENTS

JP 2012-103121 A 5/2012
WO 2011136054 A1 11/2011

OTHER PUBLICATIONS

Machine Translation of May 18, 2017 Office Action issued in Japanese Patent Application No. 2015-152102.

*Primary Examiner* — Stephanie E Bloss
(74) *Attorney, Agent, or Firm* — Oliff PLC

(57) ABSTRACT

A correction apparatus for an angle sensor includes a correction information generator for generating correction information, and a correction processing unit for performing correction processing in the course of generation of a detected angle value by an angle detector. Details of the correction processing are determined on the basis of the correction information. The correction information generator includes an error estimate generation unit and a correction information determination unit. The error estimate generation unit generates, on the basis of a first signal and a second signal, an error estimate containing a variable component that varies depending on an ideal angle estimate. The correction information determination unit determines the correction information on the basis of the error estimate.

29 Claims, 7 Drawing Sheets

(56) References Cited

U.S. PATENT DOCUMENTS

2015/0158396 A1* 6/2015 Walters .................... H02P 6/16
    701/22
2017/0314975 A1* 11/2017 Mochizuki ........... G01D 18/002
2017/0350726 A1* 12/2017 Watanabe ............. G01D 18/00

* cited by examiner

CORRECTION APPARATUS AND METHOD FOR ANGLE SENSOR, AND ANGLE SENSOR

BACKGROUND OF THE INVENTION

1. Field of the Invention

The present invention relates to a correction apparatus and a correction method for correcting an error of an angle sensor that generates a detected angle value having a correspondence with an angle to be detected, and to an angle sensor including the correction apparatus.

2. Description of the Related Art

In recent years, angle sensors have been widely used to generate a detected angle value having a correspondence with an angle to be detected in various applications, such as detection of the rotational position of a steering wheel or a power steering motor in an automobile. Examples of the angle sensors include a magnetic angle sensor. A system using the magnetic angle sensor is typically provided with a magnetic field generator for generating a rotating magnetic field whose direction rotates in response to the rotation or linear movement of an object. The magnetic field generator is a magnet, for example. The angle to be detected by the magnetic angle sensor is, for example, the angle that the direction of the rotating magnetic field in a reference position forms with respect to a reference direction.

U.S. Patent Application Publication No. 2012/0095712 A1 describes a rotating field sensor, which is a magnetic angle sensor. The rotating field sensor includes a signal generator for generating first and second signals associated with the intensities of components of a rotating magnetic field in mutually different directions, and an angle detector for calculating a detected angle value based on the first and second signals. The signal generator includes a first detection circuit for outputting the first signal, and a second detection circuit for outputting the second signal. Each of the first and second detection circuits includes at least one magnetic detection element. The magnetic detection element is, for example, a spin-valve magnetoresistance (MR) element including a magnetization pinned layer whose magnetization direction is pinned, a free layer whose magnetization direction varies depending on the direction of the rotating magnetic field, and a nonmagnetic layer located between the magnetization pinned layer and the free layer.

Ideally, when the direction of the rotating magnetic field changes with a constant angular velocity, the first signal and the second signal in the rotating field sensor should have sinusoidal waveforms (including sine waveforms and cosine waveforms) that are different in phase from each other by 90°. However, as described in U.S. Patent Application Publication No. 2012/0095712 A1, the first and second signals may have waveforms distorted from a sinusoidal curve. When the first and second signals have distorted waveforms, the first signal contains a first ideal component which varies in such a manner as to trace an ideal sinusoidal curve, and a first error component other than the first ideal component, and the second signal contains a second ideal component which varies in such a manner as to trace an ideal sinusoidal curve, and a second error component other than the second ideal component.

One of the causes of the distortion of the waveforms of the first and second signals is a variation of the magnetization direction of the magnetization pinned layer of the MR element due to the influence of the rotating magnetic field or the like. The distortion of the waveforms of the first and second signals may result in some error in the detected angle value.

U.S. Patent Application Publication No. 2012/0095712 A1 discloses a technique for reducing an error that occurs in the detected angle value. In the technique, a square-sum signal made up of the sum of the square of the first signal and the square of the second signal is generated, and the first and second signals are corrected on the basis of the generated square-sum signal.

U.S. Patent Application Publication No. 2006/0076480 A1 discloses a technique for correcting two-phase sinusoidal signals. When two-phase sinusoidal signals out of phase with each other are output from an encoder, they may form a Lissajous waveform containing an error deviating from an ideal Lissajous waveform. In this technique, such an error is detected and the two-phase sinusoidal signals are corrected on the basis of the detected error. The two-phase sinusoidal signals in U.S. Patent Application Publication No. 2006/0076480 A1 are equivalent to the first and second signals in U.S. Patent Application Publication No, 2012/0095712 A1. A radius of the Lissajous waveform in U.S. Patent Application Publication No. 2006/0076480 A1 is equivalent to a square root of the square-sum signal in U.S. Patent Application Publication No. 2012/0095712 A1. In the following description, the two-phase sinusoidal signals in U.S. Patent Application Publication No. 2006/0076480 A1 will also be referred to as the first and second signals.

Both of the techniques disclosed in U.S. Patent Application Publication Nos. 2012/0095712 A1 and 2006/0076480 A1 relate to correction performed to reduce fluctuation in the magnitude of the square-sum signal. These techniques can thus reduce an error that causes fluctuation in the square-sum signal.

While errors occurring in a detected angle value from an angle sensor vary depending on the angle to be detected, some of the errors do not cause fluctuation in the magnitude of the square-sum signal. Such an error will hereinafter be referred to as angle-dependent error. The angle-dependent error results from errors occurring in the same phase in the first signal and the second signal. More specifically, the angle-dependent error occurs, depending on the angle to be detected, when the first signal and the second signal deviate from the first ideal component and the second ideal component, respectively, by the magnitude corresponding to the angle-dependent error. For example, the angle-dependent error occurs when the free layer of the MR element in the first detection circuit and the free layer of the MR element in the second detection circuit have magnetic anisotropies in the same direction, or when there is a misalignment of relative positions of the magnetic field generator and the signal generator with respect to each other. Neither of the techniques disclosed in U.S. Patent Application Publication Nos. 2012/0095712 A1 and 2006/0076480 A1 can reduce the angle-dependent error.

OBJECT AND SUMMARY OF THE INVENTION

It is an object of the present invention to provide a correction apparatus and a correction method for an angle sensor, and the angle sensor that make it possible to reduce an error in a detected angle value generated on the basis of first and second signals, the error resulting from errors that occur in the same phase in the first and second signals.

A correction apparatus of the present invention is for use in an angle sensor that includes: a signal generator for generating a first signal and a second signal each having a correspondence with an angle to be detected; and an angle detector for generating a detected angle value by performing computations using the first signal and the second signal, the detected angle value having a correspondence with the angle to be detected. An angle sensor of the present invention includes the signal generator, the angle detector, and the correction apparatus of the present invention.

When the angle to be detected varies with a predetermined period, the first signal contains a first ideal component and a first error component, and the second signal contains a second ideal component and a second error component. The first ideal component and the second ideal component are different in phase from each other and vary periodically in such a manner as to trace an ideal sinusoidal curve.

The correction apparatus of the present invention includes: a correction information generator for generating correction information; and a correction processing unit for performing correction processing in the course of generation of the detected angle value by the angle detector, details of the correction processing being determined on the basis of the correction information. The correction processing is processing for bringing the detected angle value closer to an ideal angle estimate as compared with an uncorrected detected angle value. The ideal angle estimate corresponds to a detected angle value obtained when the first signal does not contain the first error component, the second signal does not contain the second error component, and the correction processing is not performed. The uncorrected detected angle value corresponds to a detected angle value obtained when the correction processing is not performed.

The correction information generator includes an error estimate generation unit and a correction information determination unit. The error estimate generation unit generates an error estimate on the basis of the first signal and the second signal under the condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate. The correction information determination unit determines the correction information on the basis of the error estimate.

In the correction apparatus and the angle sensor of the present invention, the angle to be detected may be an angle that the direction of a rotating magnetic field in a reference position forms with respect to a reference direction. In this case, the signal generator of the angle sensor of the present invention may include a first detection circuit for generating the first signal and a second detection circuit for generating the second signal. Each of the first and second detection circuits may include at least one magnetic detection element for detecting the rotating magnetic field. The at least one magnetic detection element may be at least one magnetoresistance element including a magnetization pinned layer whose magnetization direction is pinned, a free layer whose magnetization direction varies depending on the direction of the rotating magnetic field, and a nonmagnetic layer located between the magnetization pinned layer and the free layer.

In the correction apparatus and the angle sensor of the present invention, the first ideal component and the second ideal component may be different in phase from each other by 90°.

In the correction apparatus and the angle sensor of the present invention, the error estimate generation unit may calculate the ideal angle estimate and the uncorrected detected angle value at specified time intervals on the assumption that the angular velocity of change in the angle to be detected has a constant value, the uncorrected detected angle value being calculated on the basis of the first and second signals, and may use the difference between the uncorrected detected angle value and the ideal angle estimate as the error estimate.

In the correction apparatus and the angle sensor of the present invention, the correction processing may be processing for correcting the first and second signals. In this case, the correction information may include first correction information and second correction information. The first correction information contains one or more coefficients among a plurality of coefficients provided to express the first error component as a Fourier series. The second correction information contains one or more coefficients among a plurality of coefficients provided to express the second error component as a Fourier series. The correction information determination unit may apply a Fourier transform to a waveform representing change in the error estimate with respect to change in the ideal angle estimate and may determine the first and second correction information on the basis of the result thereof. In the correction processing, an estimate of the first error component and an estimate of the second error component may be obtained using the first and second signals before the correction processing and the first and second correction information, the estimate of the first error component may be subtracted from the first signal before the correction processing to thereby generate a corrected first signal, and the estimate of the second error component may be subtracted from the second signal before the correction processing to thereby generate a corrected second signal.

In the correction apparatus and the angle sensor of the present invention, the correction processing may be processing for generating the detected angle value by calculating the uncorrected detected angle value on the basis of the first and second signals and then correcting the uncorrected detected angle value. In this case, the correction information may be information that defines a waveform representing change in the variable component of the error estimate with respect to change in the ideal angle estimate. The correction information determination unit may apply a Fourier transform to a waveform representing change in the error estimate with respect to change in the ideal angle estimate and may determine the correction information on the basis of the result thereof.

A correction method for an angle sensor of the present invention is for use for an angle sensor including: a signal generator for generating a first signal and a second signal each having a correspondence with an angle to be detected; and an angle detector for generating a detected angle value by performing computations using the first signal and the second signal, the detected angle value having a correspondence with the angle to be detected. When the angle to be detected varies with a predetermined period, the first signal contains a first ideal component and a first error component, and the second signal contains a second ideal component and a second error component. The first ideal component and the second ideal component are different in phase from each other and vary periodically in such a manner as to trace an ideal sinusoidal curve.

The correction method of the present invention includes: a step of generating correction information; and a step of performing correction processing in the course of generation of the detected angle value by the angle detector, details of the correction processing being determined on the basis of the correction information. The correction processing is processing for bringing the detected angle value closer to an ideal angle estimate as compared with an uncorrected detected angle value. The ideal angle estimate corresponds to a detected angle value obtained when the first signal does not contain the first error component, the second signal does not contain the second error component, and the correction processing is not performed. The uncorrected detected angle value corresponds to a detected angle value obtained when the correction processing is not performed.

The step of generating the correction information includes: a first step of generating an error estimate on the basis of the first signal and the second signal under the condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate; and a second step of determining the correction information on the basis of the error estimate.

In the correction method of the present invention, the angle to be detected may be an angle that the direction of a rotating magnetic field in a reference position forms with respect to a reference direction.

In the correction method of the present invention, the first ideal component and the second ideal component may be different in phase from each other by 90°.

In the correction method of the present invention, in the first step the ideal angle estimate and the uncorrected detected angle value may be calculated at specified time intervals on the assumption that the angular velocity of change in the angle to be detected has a constant value, the uncorrected detected angle value being calculated on the basis of the first and second signals, and the difference between the uncorrected detected angle value and the ideal angle estimate may be used as the error estimate.

In the correction method of the present invention, the correction processing may be processing for correcting the first and second signals. In this case, the correction information may include first correction information and second correction information. The first correction information contains one or more coefficients among a plurality of coefficients provided to express the first error component as a Fourier series. The second correction information contains one or more coefficients among a plurality of coefficients provided to express the second error component as a Fourier series. In the second step, a Fourier transform may be applied to a waveform representing change in the error estimate with respect to change in the ideal angle estimate, and the first and second correction information may be determined on the basis of the result thereof. In the correction processing, an estimate of the first error component and an estimate of the second error component may be obtained using the first and second signals before the correction processing and the first and second correction information, the estimate of the first error component may be subtracted from the first signal before the correction processing to thereby generate a corrected first signal, and the estimate of the second error component may be subtracted from the second signal before the correction processing to thereby generate a corrected second signal.

In the correction method of the present invention, the correction processing may be processing for generating the detected angle value by calculating the uncorrected detected angle value on the basis of the first and second signals and then correcting the uncorrected detected angle value. In this case, the correction information may be information that defines a waveform representing change in the variable component of the error estimate with respect to change in the ideal angle estimate. In the second step, a Fourier transform may be applied to a waveform representing change in the error estimate with respect to change in the ideal angle estimate, and the correction information may be determined on the basis of the result thereof.

According to the present invention, the error estimate having a correspondence with the difference between the uncorrected detected angle value and the ideal angle estimate is generated on the basis of the first and second signals, and the correction information is determined on the basis of the error estimate to perform the correction processing the details of which are determined on the basis of the correction information. The present invention thus makes it possible to reduce an error in the detected angle value generated on the basis of the first and second signals, the error resulting from errors that occur in the same phase in the first and second signals.

Other and further objects, features and advantages of the present invention will appear more fully from the following description.

DETAILED DESCRIPTION OF THE PREFERRED EMBODIMENTS

First Embodiment

Preferred embodiments of the present invention will now be described in detail with reference to the drawings. First, reference is made to FIG. 1 to describe the general configuration of an angle sensor system including an angle sensor according to a first embodiment of the invention.

Figure 1:
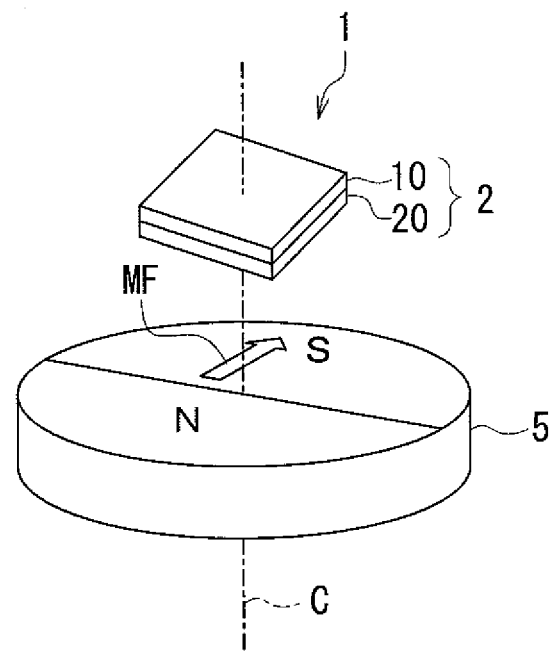
FIG. 1 is a perspective view illustrating the general configuration of an angle sensor system including an angle sensor according to a first embodiment of the invention.

The angle sensor 1 according to the present embodiment is configured to generate a detected angle value θs having a correspondence with an angle θ to be detected. The angle sensor 1 according to the present embodiment is a magnetic angle sensor, in particular. As shown in FIG. 1, the angle sensor 1 according to the present embodiment detects a rotating magnetic field MF whose direction rotates. In this case, the angle θ to be detected is the angle that the direction of the rotating magnetic field MF in a reference position forms with respect to a reference direction. The angle sensor system shown in FIG. 1 includes the angle sensor 1, and a magnet 5 having a cylindrical shape, which is an example of means for generating the rotating magnetic field MF. The magnet 5 has an N pole and an S pole that are arranged symmetrically with respect to a virtual plane including the central axis of the cylindrical shape. The magnet 5 rotates about the central axis of the cylindrical shape. Consequently, the direction of the rotating magnetic field MF generated by the magnet 5 rotates about a center of rotation C including the central axis of the cylindrical shape.

The reference position is located within a virtual plane parallel to an end face of the magnet 5. This virtual plane will hereinafter be referred to as the reference plane. In the reference plane, the direction of the rotating magnetic field MF generated by the magnet 5 rotates about the reference position. The reference direction is located within the reference plane and intersects the reference position. In the following description, the direction of the rotating magnetic field MF in the reference position refers to a direction located within the reference plane. The angle sensor 1 is placed to face the aforementioned end face of the magnet 5.

The angle sensor system of the present embodiment may be configured in other ways than illustrated in FIG. 1. The angle sensor system of the present embodiment need only be configured to vary the relative positional relationship between the angle sensor 1 and the means for generating the rotating magnetic field MF so that the direction of the rotating magnetic field MF in the reference position rotates when viewed from the angle sensor 1. For example, the magnet 5 and the angle sensor 1 arranged as shown in FIG. 1 may be configured so that: the angle sensor 1 rotates while the magnet 5 is fixed; the magnet 5 and the angle sensor 1 rotate in opposite directions; or the magnet 5 and the angle sensor 1 rotate in the same direction with mutually different angular velocities.

Alternatively, a magnet that includes one or more pairs of N and S poles arranged alternately in an annular shape may be employed in place of the magnet 5, and the angle sensor 1 may be placed in the vicinity of the outer circumference of the magnet. In this case, at least one of the magnet and the angle sensor 1 rotates.

Alternatively, a magnetic scale that includes a plurality of pairs of N and S poles arranged alternately in a liner configuration may be employed in place of the magnet 5, and the angle sensor 1 may be placed in the vicinity of the periphery of the magnetic scale. In this case, at least one of the magnetic scale and the angle sensor 1 moves linearly in the direction in which the N and S poles of the magnetic scale are aligned.

In the above-described various configurations of the angle sensor system, there also exists the reference plane having a predetermined positional relationship with the angle sensor 1, and in the reference plane, the direction of the rotating magnetic field MF rotates about the reference position when viewed from the angle sensor 1.

The angle sensor 1 includes a signal generator 2 for generating a first signal and a second signal each having a correspondence with the angle θ to be detected. The signal generator 2 includes a first detection circuit 10 for generating the first signal and a second detection circuit 20 for generating the second signal. For ease of understanding, FIG. 1 illustrates the first and second detection circuits 10 and 20 as separate components. However, the first and second detection circuits 10 and 20 may be integrated into a single component. Further, while in FIG. 1 the first and second detection circuits 10 and 20 are stacked in a direction parallel to the center of rotation C, the order of stacking may be inversed from that shown in FIG. 1. Each of the first and second detection circuits 10 and 20 includes at least one magnetic detection element for detecting the rotating magnetic field MF.

Figure 2:
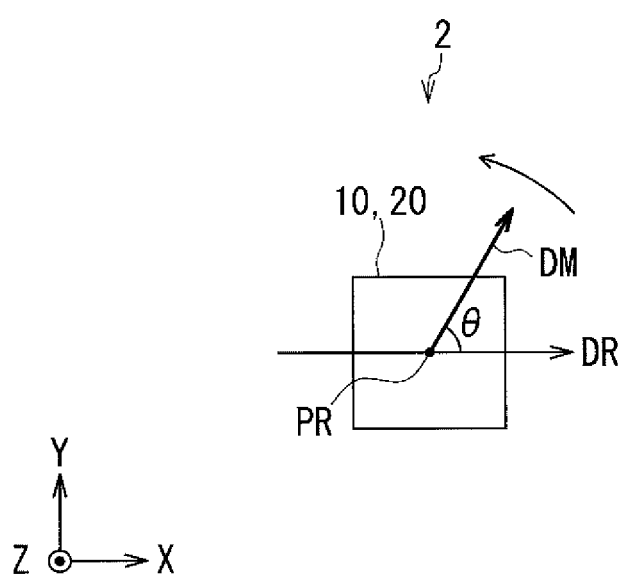
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the center of rotation C shown in FIG. 1 and from bottom to top in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The reference position PR is the position where the angle sensor 1 detects the rotating magnetic field MF. The reference direction DR shall be the X direction. As mentioned above, the angle θ to be detected is the angle that the direction DM of the rotating magnetic field MF in the reference position PR forms with respect to the reference direction DR. The direction DM of the rotating magnetic field MF shall rotate counterclockwise in FIG. 2. The angle θ will be expressed in positive values when seen counterclockwise from the reference direction DR, and in negative values when seen clockwise from the reference direction DR.

Figure 3:
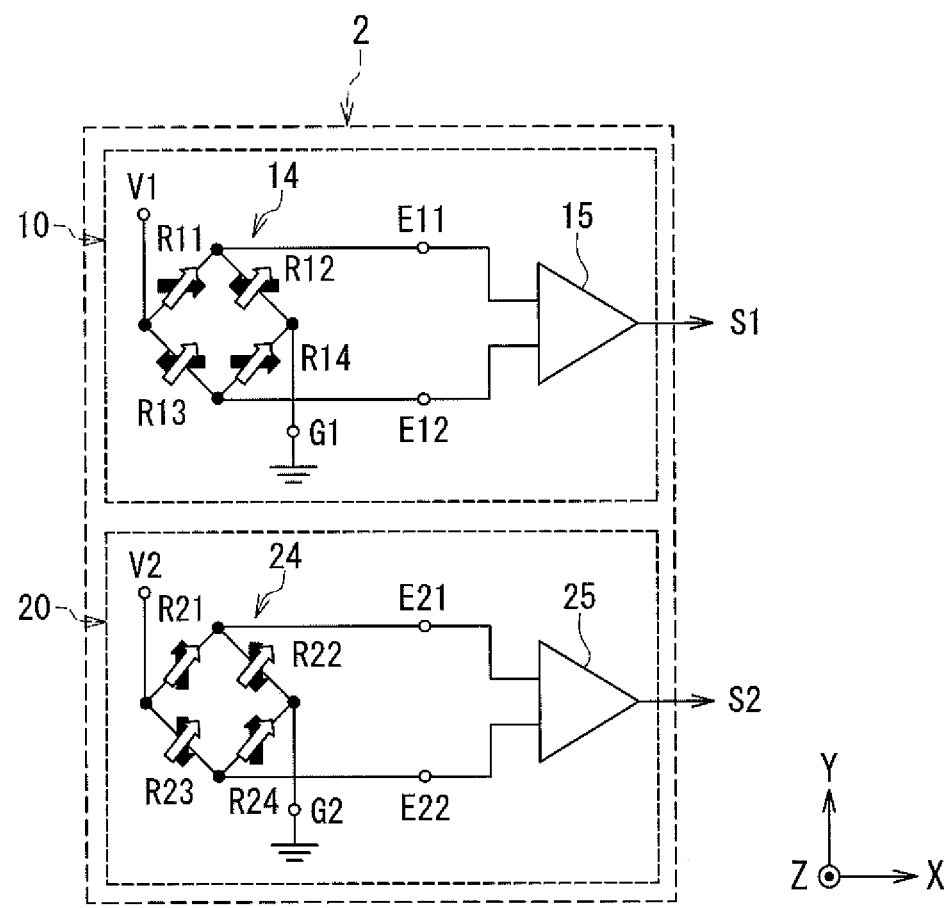
FIG. 3 is a circuit diagram illustrating the configuration of a signal generator of the angle sensor according to the first embodiment of the invention.

The configuration of the signal generator 2 will now be described in detail with reference to FIG. 3. FIG. 3 is a circuit diagram illustrating the configuration of the signal generator 2. As mentioned above, the signal generator 2 includes the first detection circuit 10 for generating the first signal S1 and the second detection circuit 20 for generating the second signal S2.

As the direction DM of the rotating magnetic field MF rotates with a predetermined period, the angle θ to be detected varies with the predetermined period. In this case, both of the first and second signals S1 and S2 vary periodically with a signal period equal to the aforementioned predetermined period. The second signal S2 differs from the first signal S1 in phase. In the present embodiment, that phase of the second signal S2 preferably differs from the phase of the first signal S1 by an odd number of times ¼ the signal period. However, in consideration of the production accuracy of the magnetic detection elements and other factors, the difference in phase between the first signal S1 and the second signal S2 can be slightly different from an odd number of times ¼ the signal period. The following description assumes that the phases of the first signal S1 and the second signal S2 satisfy the aforementioned preferred relationship.

The first detection circuit 10 includes a Wheatstone bridge circuit 14 and a difference detector 15. The Wheatstone bridge circuit 14 includes a power supply port V1, a ground port G1, two output ports E11 and E12, a first pair of serially connected magnetic detection elements R11 and R12, and a second pair of serially connected magnetic detection elements R13 and R14. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded. The difference detector 15 generates a signal corresponding to a potential difference between the output ports E11 and E12 and normalized to have an amplitude of 1, and outputs the generated signal as the first signal S1.

The second detection circuit 20 has a circuit configuration similar to that of the first detection circuit 10. More specifically, the second detection circuit 20 includes a Wheatstone bridge circuit 24 and a difference detector 25. The Wheatstone bridge circuit 24 includes a power supply port V2, a ground port G2, two output ports E21 and E22, a first pair of serially connected magnetic detection elements R21 and R22, and a second pair of serially connected magnetic detection elements R23 and R24. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded. The difference detector 25 generates a signal corresponding to a potential difference between the output ports E21 and E22 and normalized to have an amplitude of 1, and outputs the generated signal as the second signal S2.

In the present embodiment, all the magnetic detection elements included in the Wheatstone bridge circuits (hereinafter referred to as bridge circuits) 14 and 24 are magnetoresistance (MR) elements, and more specifically, spin-valve MR elements. The spin-valve MR element includes a magnetization pinned layer whose magnetization direction is pinned, a free layer which is a magnetic layer whose magnetization direction varies depending on the direction DM of the rotating magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In the following description, the magnetic detection elements included in the bridge circuits 14 and 24 will be referred to as MR elements. In FIG. 3, the filled arrows indicate the magnetization directions of the magnetization pinned layers of the MR elements, and the hollow arrows indicate the magnetization directions of the free layers of the MR elements.

In the first detection circuit 10, the magnetization pinned layers of the MR elements R11 and R14 are magnetized in the X direction, and the magnetization pinned layers of the MR elements R12 and R13 are magnetized in the X direction. In such a case, the potential difference between the output ports E11 and E12 varies according to the strength of a component in the X direction (hereinafter, "X-directional component") of the rotating magnetic field MF. Thus, the first detection circuit 10 detects the strength of the X-directional component of the rotating magnetic field MF and generates a signal that indicates the strength as the first signal S1. The strength of the X-directional component of the rotating magnetic field MF has a correspondence with the angle θ to be detected.

In the second detection circuit 20, the magnetization pinned layers of the MR elements R21 and R24 are magnetized in the Y direction, and the magnetization pinned layers of the MR elements R22 and R23 are magnetized in the Y direction. In such a case, the potential difference between the output ports E21 and E22 varies according to the strength of a component in the Y direction (hereinafter, "Y-directional component") of the rotating magnetic field MF. Thus, the second detection circuit 20 detects the strength of the Y-directional component of the rotating magnetic field MF and generates a signal that indicates the strength as the second signal S2. The strength of the Y-directional component of the rotating magnetic field MF has a correspondence with the angle θ to be detected.

In consideration of the production accuracy of the MR elements and other factors, the magnetization directions of the magnetization pinned layers of the plurality of MR elements in the detection circuits 10 and 20 may be slightly different from those described above.

Figure 5:
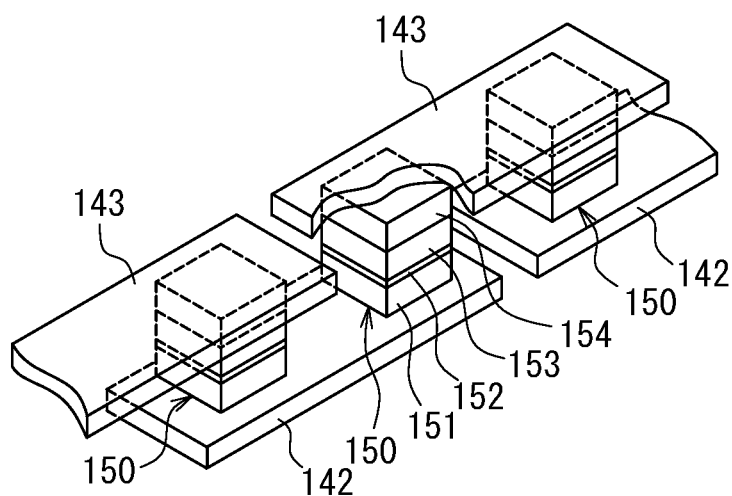
FIG. 5 is a perspective view of a portion of a magnetic detection element shown in FIG. 3.

An example of the configuration of the MR elements will now be described with reference to FIG. 5. FIG. 5 is a perspective view illustrating a portion of an MR element in the signal generator 2 shown in FIG. 3. In this example, the MR element includes a plurality of lower electrodes 142, a plurality of MR films 150 and a plurality of upper electrodes 143. The plurality of lower electrodes 142 are arranged on a substrate (not illustrated). Each of the lower electrodes 142 has a long slender shape. Every two lower electrodes 142 that are adjacent to each other in the longitudinal direction of the lower electrodes 142 have a gap therebetween. As shown in FIG. 5, MR films 150 are provided on the top surfaces of the lower electrodes 142, near opposite ends in the longitudinal direction. Each of the MR films 150 includes a free layer 151, a nonmagnetic layer 152, a magnetization pinned layer 153, and an antiferromagnetic layer 154 which are stacked in this order, the free layer 151 being closest to the lower electrode 142. The free layer 151 is electrically connected to the lower electrode 142. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 143 are arranged over the plurality of MR films 150. Each of the upper electrodes 143 has a long slender shape, and establishes electrical connection between the respective antiferromagnetic layers 154 of two adjacent MR films 150 that are arranged on two lower electrodes 142 adjacent in the longitudinal direction of the lower electrodes 142. With such a configuration, the plurality of MR films 150 in the MR element shown in FIG. 5 are connected in series by the plurality of lower electrodes 142 and the plurality of upper electrodes 143. It should be appreciated that the layers 151 to 154 of the MR films 150 may be stacked in an order reverse to that shown in FIG. 5.

As described previously, when the angle θ to be detected varies with the predetermined period, the first and second signals S1 and S2 both vary periodically with the signal period equal to the predetermined period. Ideally, each of the first and second signals S1 and S2 should have a waveform that traces a sinusoidal curve (including a sine waveform and a cosine waveform). In actuality, however, the waveforms of the first and second signals S1 and S2 are distorted from a sinusoidal curve when, for example, the magnetization direction of the magnetization pinned layer 153 of the MR film 150 varies under the influence of the rotating magnetic field MF or like factors, or when the magnetization direction of the free layer 151 of the MR film 150 differs from the direction DM of the rotating magnetic field MF due to effects such as the shape anisotropy of the free layer 151.

The distortion of the waveforms of the first and second signals S1 and S2 from a sinusoidal curve means that the first and second signals S1 and S2 each contain an ideal component which varies periodically in such a manner as to trace an ideal sinusoidal curve, and an error component other than the ideal component. In the present embodiment, when the angle θ to be detected varies with the predetermined period, the first signal S1 contains a first ideal component S1$i$ and a first error component S1$e$, and the second signal S2 contains a second ideal component S2$i$ and a second error component S2$e$. The first ideal component S1$i$ and the second ideal component S2$i$ are different in phase from each other and vary periodically in such a manner as to trace an ideal sinusoidal curve.

Figure 4:
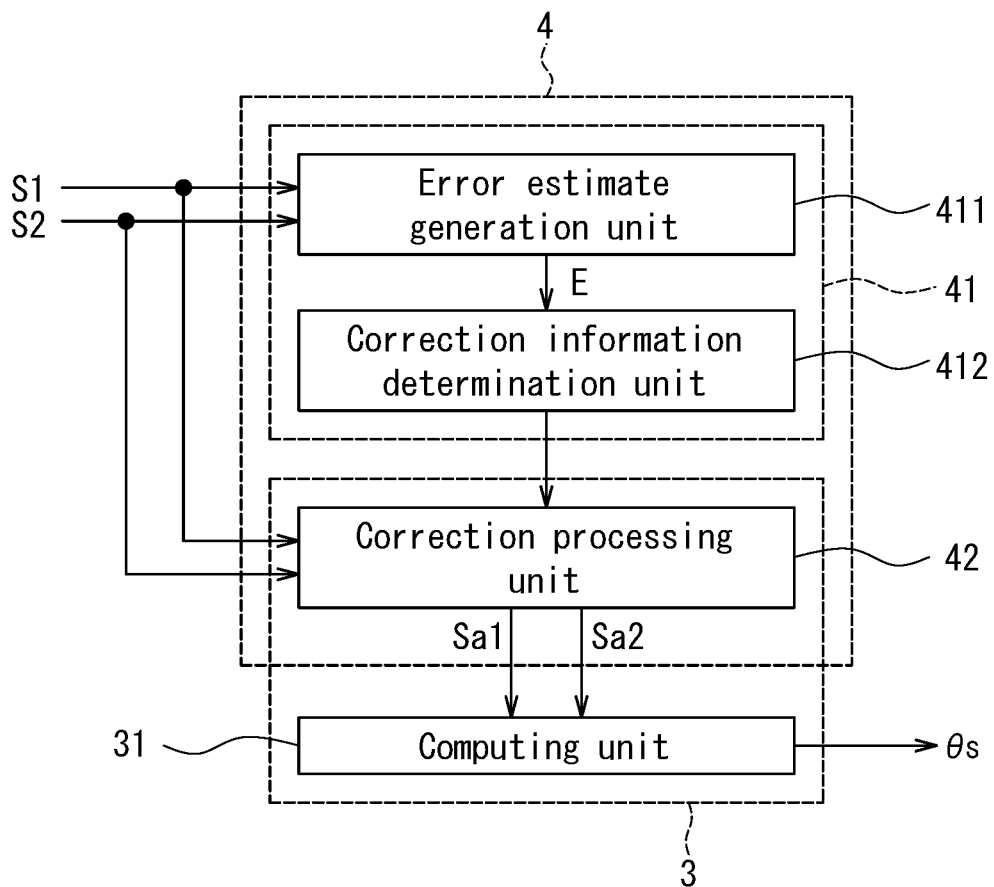
FIG. 4 is a functional block diagram illustrating the configuration of an angle detector and a correction apparatus of the angle sensor according to the first embodiment of the invention.

In the example shown in FIG. 3, the first ideal component S1$i$ has a cosine waveform dependent on the angle θ, and the second ideal component S2$i$ has a sine waveform dependent on the angle θ. In this case, the phases of the first ideal component S1$i$ and the second ideal component S2$i$ are different by π/2, i.e., 90°. Now, components of the angle sensor 1 other than the signal generator 2 will be described with reference to FIG. 4. The angle sensor 1 includes an angle detector 3 and a correction apparatus 4 shown in FIG. 4, in addition to the signal generator 2. FIG. 4 is a functional block diagram illustrating the configuration of the angle detector 3 and the correction apparatus 4. The angle detector 3 performs computations using the first signal S1 and the second signal S2 to generate the detected angle value θs having a correspondence with the angle θ to be detected.

The angle detector 3 includes a computing unit 31 for performing computations for generating the detected angle value θs. The correction apparatus 4 includes a correction information generator 41 for generating correction information, and a correction processing unit 42. In the course of generation of the detected angle value θs by the angle detector 3, the correction processing unit 42 performs correction processing the details of which are determined on the basis of the correction information. The correction processing unit 42 is thus incorporated in the angle detector 3.

A value corresponding to the detected angle value θs obtained when the correction processing is not performed will be referred to as an uncorrected detected angle value and denoted by symbol θp. A value corresponding to the detected angle value θs obtained when the first signal S1 does not contain the first error component S1$e$, the second signal S2 does not contain the second error component S2$e$, and the correction processing is not performed will be referred to as an ideal angle estimate and denoted by symbol θc. The correction processing is processing for bringing the detected angle value θs closer to the ideal angle estimate θc as compared with the uncorrected detected angle value θp.

The correction information generator 41 includes: an error estimate generation unit 411 for generating an error estimate E on the basis of the first and second signals S1 and S2; and a correction information determination unit 412 for determining correction information on the basis of the error estimate E. The error estimate E has a correspondence with a difference between the uncorrected detected angle value θp and the ideal angle estimate θc, i.e., θp minus θc. The error estimate E contains a variable component Ev that varies depending on the ideal angle estimate θc. The first signal S1 used at the correction information generator 41 is the first signal S1 under the condition that the first signal S1 varies over time to contain the first ideal component S1$i$ and the first error component S1$e$. Similarly, the second signal S2 used at the correction information generator 41 is the second signal S2 under the condition that the second signal S2 varies over time to contain the second ideal component S2$i$ and the second error component S2$e$.

The angle detector 3 and the correction apparatus 4 can be implemented by an application-specific integrated circuit (ASIC) or a microcomputer, for example.

Figure 6:
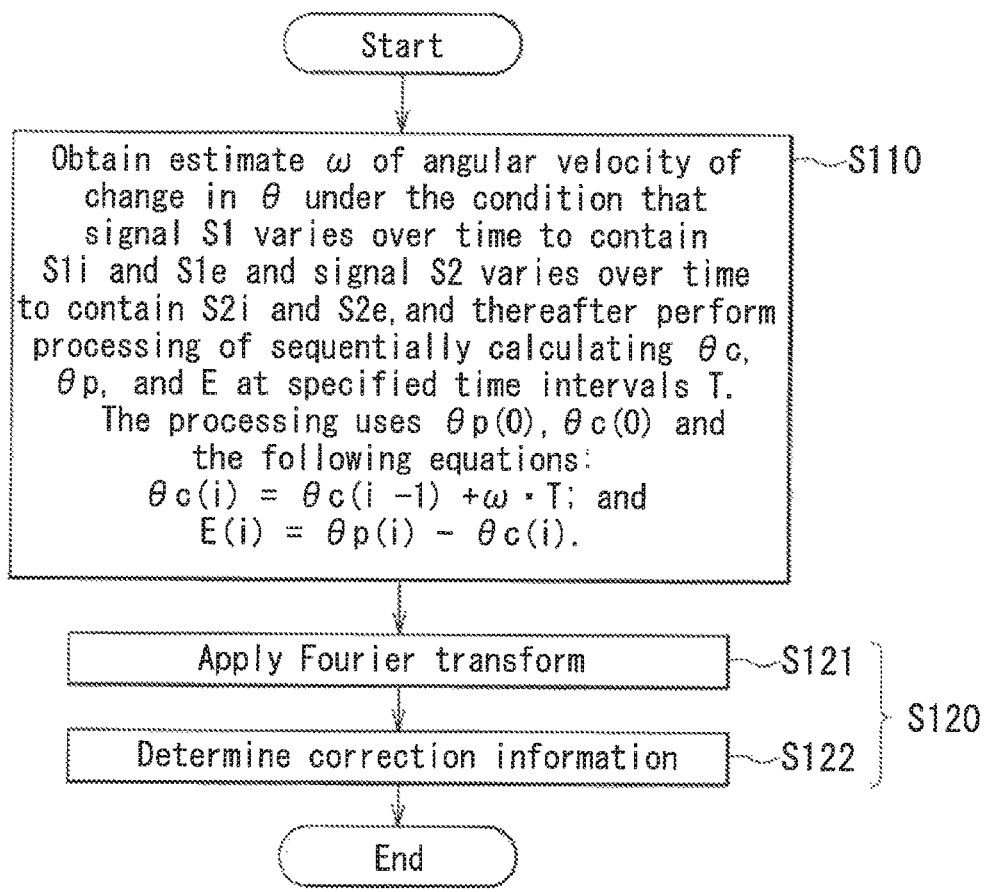
FIG. 6 is a flowchart of the step of generating correction information in a correction method for the angle sensor according to the first embodiment of the invention.
Figure 7:
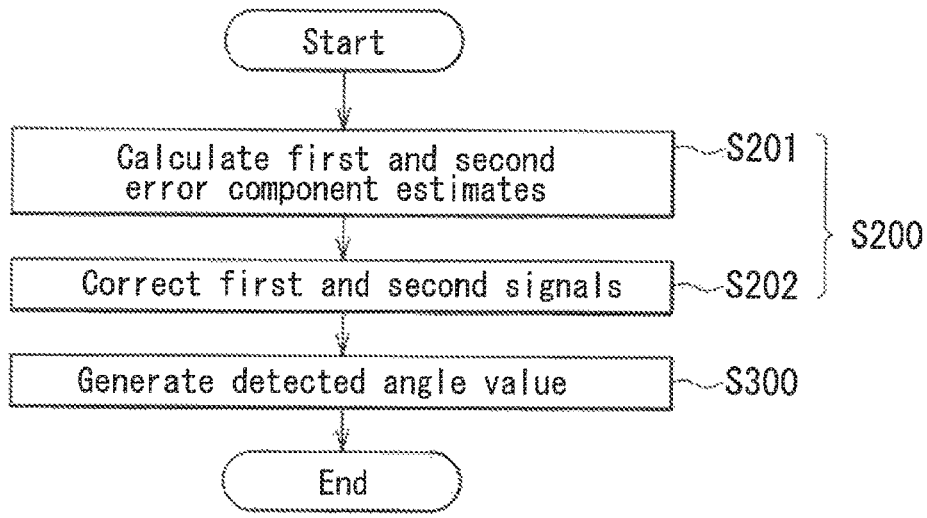
FIG. 7 is a flowchart of the operation of the angle detector of the angle sensor according to the first embodiment of the invention.

Now, the operations of the angle detector 3 and the correction apparatus 4 and a correction method for the angle sensor 1 according to the present embodiment will be described with reference to FIG. 4, FIG. 6 and FIG. 7. The correction method according to the present embodiment includes a step of generating correction information, and a step of performing correction processing, details of which are determined on the basis of the correction information, in the course of generation of the detected angle value θs by the angle detector 3. FIG. 6 is a flowchart of the step of generating the correction information. The step shown in FIG. 6 is executed before shipment or use of the angle sensor 1. FIG. 7 is a flowchart of the operation of the angle detector 3. The operation shown in FIG. 7 includes the step of performing the correction processing. The operation shown in FIG. 7 is executed while the angle sensor 1 is in use.

As shown in FIG. 6, the step of generating the correction information includes a first step S110 of generating the error estimate E on the basis of the first and second signals S1 and S2, and a second step S120 of determining the correction information on the basis of the error estimate E. The first and second signals S1 and S2 used in the first step S110 is the same as those used at the correction information generator 41.

The first step S110 will now be described. The first step S110 is executed by the error estimate generation unit 411. The error estimate generation unit 411 calculates the ideal angle estimate θc and the uncorrected detected angle value θp at specified time intervals on the assumption that the angular velocity of change in the angle θ to be detected has a constant value. The uncorrected detected angle value θp is calculated on the basis of the first and second signals S1 and S2. The error estimate generation unit 411 uses the difference between the uncorrected detected angle value θp and the ideal angle estimate θc as the error estimate E.

The first step S110 is executed under the condition that the angular velocity of change in the angle θ to be detected can be assumed to have a constant value, i.e., under the condition that the angle θ to be detected changes with a constant or almost constant angular velocity. This condition is fulfilled by rotating the magnet 5 with a constant or almost constant angular velocity in the angle sensor system shown in FIG. 1. This condition can also be said to be the condition that the first signal S1 varies over time to contain the first ideal component S1$i$ and the first error component S1$e$ and the second signal S2 varies over time to contain the second ideal component S2$i$ and the second error component S2$e$.

In the first step S110, an estimate ω of the angular velocity of change in the angle θ is first obtained under the above-described condition. The estimate ω of the angular velocity may be obtained in the following manner, for example. Specifically, the uncorrected detected angle value θp is calculated sequentially at specified time intervals T, and the angular velocity of change in the uncorrected detected angle value θp is also calculated. Furthermore, an average of the calculated angular velocities of change in the uncorrected detected angle value θp is calculated. This processing is performed over a rather long period of time, such as a period of time over which the uncorrected detected angle value θp changes by one period, i.e., 360°, and the angular velocities of change in the uncorrected detected angle value θp are averaged to use the obtained average as the estimate ω of the angular velocity of change in the angle θ.

In the first step S110, after the estimate ω of the angular velocity is obtained, processing of sequentially calculating the ideal angle estimate ωc, the uncorrected detected angle value ωp, and the error estimate E at specified time intervals T is performed under the above-described condition. This processing is performed, for example, over a period of time over which the uncorrected detected angle value θp changes by one period. Let θp(0) be the value of the uncorrected detected angle value θp at the point in time when θp is calculated for the first time after the processing of sequentially calculating θc, θp and E is started. The values of θc and E at the point in time when θp(0) is calculated are not obtainable by calculation. In the present embodiment, the values of θc and E at the point in time when θp(0) is calculated are denoted as θc(0) and E(0), respectively. The value θc(0) is set to be equal to θp(0), and the value E(0) is set to 0.

The ideal angle estimate θc, the uncorrected detected angle value θp, and the error estimate E calculated at an i-th point in time after θp(0) is calculated are denoted as θc(i), θp(i), and E(i), respectively, where i is an integer of 1 or more.

The error estimate generation unit 411 calculates θp by Equation (1) below.

$$\theta p = a\tan(S2/S1) \quad (1)$$

In Equation (1), a tan(S2/S1) represents arc tangent calculation to obtain θp, and S1 and S2 represent values of the first and second signals S1 and S2 at the point in time when θp is calculated. For θp in the range of 0° to less than 360°, there are two solutions of θp in Equation (1) with a difference of 180° in value. Which of the two solutions of θp in Equation (1) is the true value of θp can be determined from the combination of positive and negative signs on S1 and S2. More specifically, if S1 is positive in value, θp falls within a range that is greater than or equal to 0° and smaller than 90°, and a range that is greater than 270° and smaller than or equal to 360'. If S1 is negative in value, θp is greater than 90° and smaller than 270°. If S2 is positive in value, θp is greater than 0° and smaller than 180°. If S2 is negative in value, θp is greater than 180° and smaller than 360°. Using Equation (1) and on the basis of the foregoing determination from the combination of positive and negative signs on S1 and S2, the error estimate generation unit 411 determines θp within the range of 0° to less than 360°.

The error estimate generation unit 411 calculates θc(i) by Equation (2) below.

$$\theta c(i) = \theta c(i-1) + \omega \cdot T \quad (2)$$

The error estimate generation unit 411 further calculates E(i) by Equation (3) below.

$$E(i) = \theta p(i) - \theta c(i) \quad (3)$$

Now, the second step S120 will be described. The second step S120 is executed by the correction information determination unit 412. As shown in FIG. 6, the second step S120 includes: a step S121 of applying a Fourier transform to a waveform that represents change in the error estimate E with respect to change in the ideal angle estimate θc; and a step S122 of determining correction information on the basis of the result of the step S121. The aforementioned waveform will hereinafter be referred to as the waveform of the error estimate E.

First, the step S121 of applying the Fourier transform to the waveform of the error estimate E will be described. In the step S121, the Fourier transform is applied to the waveform of the error estimate E on the basis of θc(i) and E(i) which are calculated in the first step S110. In the present embodiment, the waveform of the error estimate E is expressed by discretized data. Therefore, in the step S121, a discrete Fourier transform (DFT) is applied to the waveform of the error estimate E. In this case, in the step S121, a frequency-domain function is obtained by product sum operation for each frequency expressed by an integer equal to or greater than 0. In the step S121, an amplitude and a phase of the frequency-domain function of each frequency are obtained.

The step S121 may be executed after the error estimate E for one period of the uncorrected detected angle value θp is obtained in the step S110, or may be executed simultaneously with the step S110. In the case where the step S121 is executed simultaneously with the step S110, the result of product sum operation for obtaining a frequency-domain function of each frequency is updated in the step S121 whenever new error estimate E(i) is obtained in the step S110. By repeatedly executing this, the frequency-domain function of each frequency is obtained in the step S121 after a last error estimate E(i) is obtained in the step S110.

On the basis of the result of the Fourier transform in the step S121, the error estimate E is expressible by Equations (4A) and (4B) below. In Equation (4B), Ec is a constant value corresponding to the amplitude of the frequency-domain function of frequency 0 after the Fourier transform.

$$E = Ec + Ev \quad (4A)$$

$$Ev = A_1\cos(\theta c - \alpha_1) + A_2\cos\{(\theta c - \alpha_2)\} + A_3\cos\{3(\theta c - \alpha_3)\} + \ldots \quad (4B)$$

In the following description, the term "$A_n \cos\{n(\theta c - \alpha_n)\}$" in Equation (4B) will be referred to as the n-th order component of the error estimate E, n being an integer of 1 or more. Then, in the step S121, an amplitude $A_n$ and a phase $\alpha_n$ of the n-th order component of the error estimate E are obtained. The amplitude $A_n$ and the phase $\alpha_n$ of the n-th order component of the error estimate E can be obtained from the amplitude and the phase of the frequency-domain function of frequency n after the Fourier transform.

The step S122 of determining correction information will now be described. As described previously, in the step S122, correction information is determined on the basis of the result of the step S121 of applying the Fourier transform. In the present embodiment, in particular, in the step S122, correction information is determined on the basis of the variable component Ev of the error estimate E in disregard of Ec corresponding to the amplitude of the function of the frequency domain of frequency 0 after the Fourier transform.

The reason for disregarding Ec is as follows. As described previously, in the first step S110, the value E(0) of the error estimate E at the point in time when θp(0) is calculated is set to 0 regardless of the value of an actual error, i.e., the difference between the uncorrected detected angle value θp and the angle θ to be detected. Due to this processing, Ec varies depending on the point in time at which θp(0) is calculated. As described later in detail, the present embodiment reduces the angle-dependent error. The value Ec is unrelated to the angle-dependent error. It is the variable component Ev of the error estimate E that is related to the angle-dependent error. For this reason, in the present embodiment the correction information is determined on the basis of the variable component Ev in disregard of Ec.

In the present embodiment, the correction information includes first correction information and second correction information. The first error component S1c of the first signal S1 is expressible as a Fourier series by Equation (5). The first correction information contains one or more coefficients among a plurality of coefficients $a_{11}, a_{12}, a_{13}, a_{14}, \ldots, b_{11}, b_{12}, b_{13}, b_{14}$, obtained when the first error component S1c is expressed as a Fourier series by Equation (5). Similarly, the second error component S2e of the second signal S2 is expressible as a Fourier series by Equation (6). The second correction information contains one or more coefficients among a plurality of coefficients $a_{21}, a_{22}, a_{23}, a_{24}, \ldots, b_{21}, b_{22}, b_{23}, b_{24}, \ldots$ obtained when the second error component S2e is expressed as a Fourier series by Expression (6), $$S1e = a_{11}\cos\theta c + b_{11}\sin\theta c + a_{12}\cos 2\theta c + b_{12}\sin\theta c + \quad (5)$$
$$a_{13}\cos 3\theta c + b_{13}\sin 3\theta c + a_{14}\cos 4\theta c + b_{14}\sin 4\theta c + \ldots$$

$$S2e = a_{21}\cos\theta c + b_{21}\sin\theta c + a_{22}\cos 2\theta c + b_{22}\sin\theta c + \quad (6)$$
$$a_{23}\cos 3\theta c + b_{23}\sin 3\theta c + a_{24}\cos 4\theta c + b_{24}\sin 4\theta c + \ldots$$

In the step S122, the first correction information and the second correction information are calculated on the basis of the amplitude $A_n$ and the phase $\alpha_n$ of the n-th order component of the error estimate E obtained in the step S121.

Hereinafter, coefficients of $\cos(m\theta c)$ and $\sin(m\theta c)$ in Equation (5) will be represented by symbols $a_{1m}$ and $b_{1m}$, respectively, and coefficients of $\cos(m\theta c)$ and $\sin(m\theta c)$ in Equation (6) will be represented by symbols $a_{2m}$ and $b_{2m}$, respectively, where m is an integer of 1 or more.

A method for calculating the coefficients $a_{1m}$, $b_{1m}$, $a_{2m}$, and $b_{2m}$ will be described by taking as an example a case where the variable component Ev of the error estimate E contains only the second-order component $A_2 \cos\{2(\theta c - \alpha_2)\}$ of the error estimate E. Assume here that the first ideal component S1i of the first signal S1 has a cosine waveform dependent on the ideal angle estimate θc. In this case, the first error component S1e of the first signal S1 is expressed by Equation (7) below.

$$S1e = S1 - S1i \quad (7)$$
$$= \cos(\theta c + E) - \cos\theta c$$
$$= \cos\theta c \cdot \cos E - \sin\theta c \cdot \sin E - \cos\theta c$$

When x is small enough, cos x and sin x can be approximated to 1 and x, respectively. In the present embodiment, the error estimate E is a value small enough to approximate cos E and sin E to 1 and E, respectively. When this approximation is applied to Equation (7), the first error component S1e is expressed by Equation (8) below.

$$\begin{aligned} S1e &\approx \cos\theta c - \sin\theta c \cdot E - \cos\theta c \quad (8)\\ &= -\sin\theta c \cdot E \\ &= -\sin\theta c \cdot A_2 \cos\{2(\theta c - \alpha_2)\} \\ &= -A_2\{\sin(3\theta c - 2\alpha_2) + \sin(-\theta c + 2\alpha_2)\}/2 \\ &= -A_2\{\sin 3\theta c \cdot \cos 2\alpha_2 - \cos 3\theta c \cdot \sin 2\alpha_2\}/2 + \\ &\quad A_2\{\sin\theta c \cdot \cos 2\alpha_2 - \cos\theta c \cdot \sin 2\alpha_2\}/2 \\ &= \{(-A_2 \sin 2\alpha_2)/2\} \cdot \cos\theta c + \{(A_2 \cos 2\alpha_2)/2\} \cdot \sin\theta c + \\ &\quad \{(A_2 \sin 2\alpha_2)/2\} \cdot \cos 3\theta c + \{(-A_2 \cos 2\alpha_2)/2\} \cdot \sin 3\theta c \end{aligned}$$

By comparing Equations (5) and (8), the coefficients $a_{1m}$ and $b_{1m}$ are obtained as follows.
$a_{11} = (-A_2 \sin 2\alpha_2)/2$
$b_{11} = (A_2 \cos 2\alpha_2)/2$
$a_{12} = 0$
$b_{12} = 0$
$a_{13} = (A_2 \sin 2\alpha_2)/2$
$B_{13} = (-A_2 \cos 2\alpha_2)/2$
$a_{14} = 0$
$b_{14} = 0$ The values $A_2$ and $\alpha_2$ have been obtained in the step S121. The coefficients $a_{11}, b_{11}, a_{13}$, and $b_{13}$ can thus be calculated using $A_2$ and $\alpha_2$.

Assume that the second ideal component S2i of the second signal S2 has a sine waveform dependent on the ideal angle estimate θc. In this case, by transforming the equation expressing the second error component S2e of the second signal S2 in the same manner as Equation (8), the second error component S2e is expressible by Equation (9) below.

$$\begin{aligned} S2e &\approx \sin\theta c + \cos\theta c \cdot E - \sin\theta c \quad (9)\\ &= \{(A_2 \cos 2\alpha_2)/2\} \cdot \cos\theta c + \{(A_2 \sin 2\alpha_2)/2\} \cdot \sin\theta c + \\ &\quad \{(A_2 \cos 2\alpha_2)/2\} \cdot \cos 3\theta c + \{(A_2 \sin 2\alpha_2)/2\} \cdot \sin 3\theta c \end{aligned}$$

By comparing Equations (9) and (6), the coefficients $a_{2m}$ and $b_{2m}$ are obtained as follows.
$a_{21} = (A_2 \cos 2\alpha_2)/2$
$b_{21} = (A_2 \sin 2\alpha_2)/2$
$a_{22} = 0$
$b_{22} = 0$
$a_{23} = (A_2 \cos 2\alpha_2)/2$
$b_{23} = (A_2 \sin 2\alpha_2)/2$
$a_{24} = 0$
$b_{24} = 0$ As described above, the values $A_2$ and $a_2$ have been obtained in the step S121. The coefficients $a_{21}, b_{21}, a_{23}$, and $b_{23}$ can thus be calculated using $A_2$ and $\alpha_2$.

Not only in the case where the variable component Ev of the error estimate E contains only the second-order component of the error estimate E, but also in the case where the variable component Ev of the error estimate E contains a plurality of different n-th order components of the error estimate E, the coefficients $a_{1m}, b_{1m}, a_{2m}$, and $b_{2m}$ can be calculated using the amplitude $A_n$ and the phase $\alpha_n$ of the plurality of different n-th order components. For example, when the variable component Ev of the error estimate E contains a first-order component $A_1 \cos(\theta c-\alpha_1)$, a second-order component $A_2 \cos\{2(\theta c-\alpha_2)\}$ and a third-order component $A_3 \cos\{3(\theta c-\alpha_3)\}$, the coefficients $a_{1m}$ and $b_{1m}$ are expressed as below. The values $A_1$ to $A_3$, and $\alpha_1$ to $\alpha_3$ have been obtained in the step S121. The coefficients $a_{11}$ to $a_{14}$ and $b_{11}$ to $b_{14}$ can thus be calculated using $A_1$ to $A_3$, and $\alpha_1$ to $\alpha_3$.

$a_{11}=(A_2 \sin 2\alpha_2)/2$
$b_{11}=(A_2 \cos 2\alpha_2)/2$
$a_{12}=(A_1 \sin \alpha_1 - A_3 \sin 3\alpha_3)/2$
$b_{12}=(A_1 \cos \alpha_1 + A_3 \cos 3\alpha_3)/2$
$a_{13}=(A_2 \sin 2\alpha_2)/2$
$b_{13}=(A_2 \cos 2\alpha_2)/2$
$a_{14}=(A_3 \sin 3\alpha_3)/2$
$b_{14}=(A_3 \cos 3\alpha_3)/2$ Likewise, the coefficients $a_{2m}$ and $b_2$, are expressed as follows. The values $A_1$ to $A_3$, and $\alpha_1$ to $\alpha_3$ have been obtained in the step S121. The coefficients $a_{21}$ to $a_{24}$ and $b_{21}$ to $b_{24}$ can thus be calculated using $A_1$ to $A_3$, and $\alpha_1$ to $\alpha_3$.

$a_{21}$ $(A_2 \cos 2\alpha_2)/2$
$b_{21}=(A_2 \sin 2\alpha_2)/2$
$a_{22}=(A_1 \cos \alpha_1 + A_3 \cos 3\alpha_3)/2$
$b_{22}=(A_1 \sin \alpha_1 + A_3 \sin 3\alpha_3)/2$
$a_{23}$ $(A_2 \cos 2\alpha_2)/2$
$b_{23}=(A_2 \sin 2\alpha_2)/2$
$a_{24}=(A_3 \cos 3\alpha_3)/2$
$b_{24}=(A_3 \sin 3\alpha_3)/2$ The correction information is determined by calculating the coefficients $a_{1m}$, $b_{1m}$, $a_{2m}$, and $b_{2m}$ in the above-described manner. The following description assumes that the first correction information contains all the calculated coefficients $a_{1m}$ and $b_{1m}$, and the second correction information contains all the calculated coefficients $a_{2m}$ and $b_{2m}$. Once the correction information is determined, the details of the correction processing in the step of performing the correction processing are also determined. As mentioned before, the step of generating the correction information illustrated in FIG. 6 is executed before shipment or use of the angle sensor 1. Therefore, the details of the correction processing are determined before use of the angle sensor 1.

The operation of the angle detector 3 will now be described with reference to FIG. 7. The operation illustrated in FIG. 7 starts with executing a step S200 of performing correction processing. The step S200 of performing correction processing is executed by the correction processing unit 42. In the present embodiment, the correction processing is processing for correcting the first and second signals S1 and S2. As shown in FIG. 7, the step S200 of performing the correction processing includes a step S201 of calculating an estimate Ep1 of the first error component S1e and an estimate Ep2 of the second error component S2e, and a step S202 of correcting the first and second signals S1 and S2. The first and second signals S1 and S2 used at the correction processing unit 4 and in the step S200 are those when the angle sensor 1 is in use.

The step S201 of calculating the estimates Ep1 and Ep2 will now be described. The correction processing unit 42 determines the estimates Ep1 and Ep2 using the first and second signals S1 and S2 before the correction processing, the first correction information or the coefficients $a_{1m}$ and $b_{1m}$, and the second correction information or the coefficients $a_{2m}$ and $b_{2m}$. The estimate Ep1 is expressed by Equation (10). The estimate Ep2 is expressed by Equation (11).

$$Ep1 = a_{11}\cos\theta p + b_{11}\sin\theta p + a_{12}\cos 2\theta p + b_{12}\sin 2\theta p + \\ a_{13}\cos 3\theta p + b_{13}\sin 3\theta p + a_{14}\cos 4\theta p + b_{14}\sin 4\theta p + \ldots \quad (10)$$

$$Ep2 = a_{21}\cos\theta p + b_{21}\sin\theta p + a_{22}\cos 2\theta p + b_{22}\sin 2\theta p + \\ a_{23}\cos 3\theta p + b_{23}\sin 3\theta p + a_{24}\cos 4\theta p + b_{24}\sin 4\theta p + \ldots \quad (11)$$

The right-hand side of Equation (10) is the same as the right-hand side of Equation (5) expressing the first error component S1e, except that the ideal angle estimate $\theta c$ is replaced with the uncorrected detected angle value $\theta p$. The right-hand side of Equation (11) is the same as the right-hand side of Equation (6) expressing the second error component S2e, except that the ideal angle estimate $\theta c$ is replaced with the uncorrected detected angle value $\theta p$. The value of the first error component S1e obtained from Equation (5) by replacing the ideal angle estimate $\theta c$ with the uncorrected detected angle value $\theta p$, and the value of the first error component Sic obtained from Equation (5) on the basis of the ideal angle estimate $\theta c$ differ very slightly from each other. Similarly, the value of the second error component S2e obtained from Equation (6) by replacing the ideal angle estimate $\theta c$ with the uncorrected detected angle value $\theta p$, and the value of the second error component S2e obtained from Equation (6) on the basis of the ideal angle estimate $\theta c$ differ very slightly from each other. Thus, the estimates Ep1 and Ep2 obtained by Equations (10) and (11) have sufficient precision.

The correction processing unit 42 may obtain the uncorrected detected angle value $\theta p$ from the first and second signals S1 and S2 before the correction processing using Equation (1), and may obtain the estimates Ep1 and Ep2 by substituting $\theta p$ for Equations (10) and (11).

Alternatively, the correction processing unit 42 may obtain the estimates Ep1 and Ep2 without obtaining the uncorrected detected angle value $\theta p$ as described below. First, $\cos \theta p$ and $\sin \theta p$ in the right-hand side of Equation (10) and the right-hand side of Equation (11) are a value of the first signal S1 before the correction processing and a value of the second signal S2 before the correction processing, respectively. The terms of the second- or higher-order components in the right-hand side of Equation (10) and in the right-hand side of Equation (11) may be expressed with $\cos \theta p$ and $\sin \theta p$ by using formulas such as a double-angle formula and a triple angle formula of trigonometric functions. For example, $\cos 2\theta p$, $\sin 2\theta p$, $\cos 3\theta p$, $\sin 3\theta p$, $\cos 4\theta p$, and $\sin 4\theta p$ are expressed by Equations (12A), (12B), (12C), (12D), (12E), and (12F) below, respectively.

$$\cos 2\theta p = \cos^2\theta p - \sin^2\theta p \quad (12A)$$

$$\sin 2\theta p = 2 \sin \theta p \cdot \cos \theta p \quad (12B)$$

$$\cos 3\theta p = 4 \cos^3\theta p - 3 \cos \theta p \quad (12C)$$

$$\sin 3\theta p = 3 \sin \theta p - 4 \sin^3\theta p \quad (12D)$$

$$\cos 4\theta p = 8 \cos^4\theta p - 8 \cos^2\theta p + 1 \quad (12E)$$

$$\sin 4\theta p = \cos \theta p \cdot (4 \sin \theta p - 8 \sin^3\theta p) \quad (12F)$$

The estimates Ep1 and Ep2 can thus be calculated by using the value $\cos \theta p$ of the first signal S1 before the correction processing, the value $\sin \theta p$ of the second signal S2 before the correction processing, the first correction information or the coefficients $a_{1m}$ and $b_{1m}$, and the second correction information or the coefficients $a_{2m}$ and $b_{2m}$.

Now, the step S202 of correcting the first and second signals S1 and S2 will be described. The correction processing unit 42 subtracts the estimate Ep1 of the first error component S1c from the first signal S1 before the correction processing to thereby generate a corrected first signal Sa1, and subtracts the estimate Ep2 of the second error component S2e from the second signal S2 before the correction processing to thereby generate a corrected second signal Sa2. The corrected first and second signals Sa1 and Sa2 are expressed by Equations (13A) and (13B) below.

$$Sa1=S1-Ep1 \quad (13A)$$

$$Sa2=S2-Ep2 \quad (13B)$$

Next, a step S300 of generating the detected angle value θs will be described. The step S300 is executed by the computing unit 31 of the angle detector 3. The computing unit 31 calculates the detected angle value θs, which has a correspondence with the angle θ, on the basis of the corrected first and second signals Sa1 and Sa2. More specifically, the computing unit 31 calculates θs by Equation (14) below, for example. Note that "a tan" in Equation (14) represents arctangent.

$$\theta s = a\ \tan(Sa2/Sa1) \quad (14)$$

In Equation (14), a tan(Sa2/Sa1) represents arc tangent calculation to obtain θs. For θs in the range of 0° to less than 360°, there are two solutions of θs in Equation (14) with a difference of 180° in value. Which of the two solutions of θs in Equation (14) is the true value of θs can be determined from the combination of positive and negative signs on Sa1 and Sa2. The relationship between the true value of θs and the combination of positive and negative signs on Sa1 and Sa2 is the same as the previously mentioned relationship between the true value of θp and the combination of positive and negative signs on S1 and S2.

As described previously, the present embodiment reduces the angle-dependent error. The angle-dependent error is an error that occurs in the detected angle value θs generated on the basis of the first and second signals S1 and S2 due to errors occurring in the same phase in the first and second signals S1 and S2. More specifically, the angle-dependent error occurs, depending on the angle θ to be detected, when the first signal S1 and the second signal S2 deviate from the first ideal component S1i and the second ideal component S2i, respectively, by the magnitude corresponding to the angle-dependent error. While the angle-dependent error varies depending on the angle θ to be detected, it does not cause fluctuation in the magnitude of a square-sum signal made up of the sum of the square of the first signal S1 and the square of the second signal S2. Here, the angle-dependent error occurring in the detected angle value θs when the correction processing of the present embodiment is not performed will be denoted as θe. For example, the angle-dependent error θe occurs when the free layer 151 of the MR film 150 in the first detection circuit 10 and the free layer 151 of the MR film 150 in the second detection circuit 20 have magnetic anisotropies in the same direction, or when there is a misalignment of relative positions of the magnet 5 and the signal generator 2 with respect to each other. Neither of the techniques disclosed in U.S. Patent Application Publication Nos. 2012/0095712 A1 and 2006/0076480 A1 can reduce the angle-dependent error.

Now, a description will be given of the first signal S1 and the second signal S2 in the case where the angle-dependent error θe is the only error occurring in the detected angle value θs. First, the angle-dependent error θe is expressible by Equation (15) below, which is similar to Equation (4B).

$$\theta e = A_{01}\cos(\theta - \alpha_{01}) + A_{02}\cos\{2(\theta - \alpha_{02})\} + A_{03}\cos\{3(\theta - \alpha_{03})\} + \ldots \quad (15)$$

Figure 8:
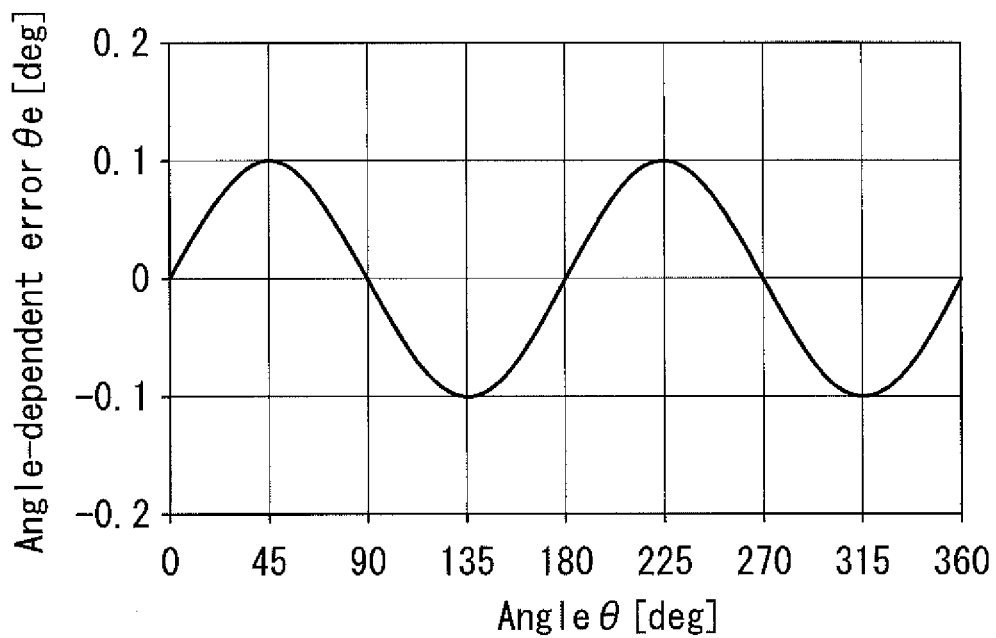
FIG. 8 is a waveform diagram illustrating an example of waveform of an angle-dependent error.

FIG. 8 illustrates an example of waveform of the angle-dependent error θe. In FIG. 8, the horizontal axis represents the angle θ, and the vertical axis represents the angle-dependent error θe. The example shown in FIG. 8 is where the angle-dependent error θe is 0.1 cos {2(θ−45°)}.

When the angle-dependent error θe is the only error occurring in the detected angle value θs, the first signal S1 and the second signal S2 are expressible as cos(θ+θe) and sin(θ+θe), respectively. In this case, the square-sum signal is expressed by Equation (16) below.

$$S1^2 + S2^2 = \cos^2(\theta+\theta e) + \sin^2(\theta+\theta e) = 1 \quad (16)$$

Figure 9:
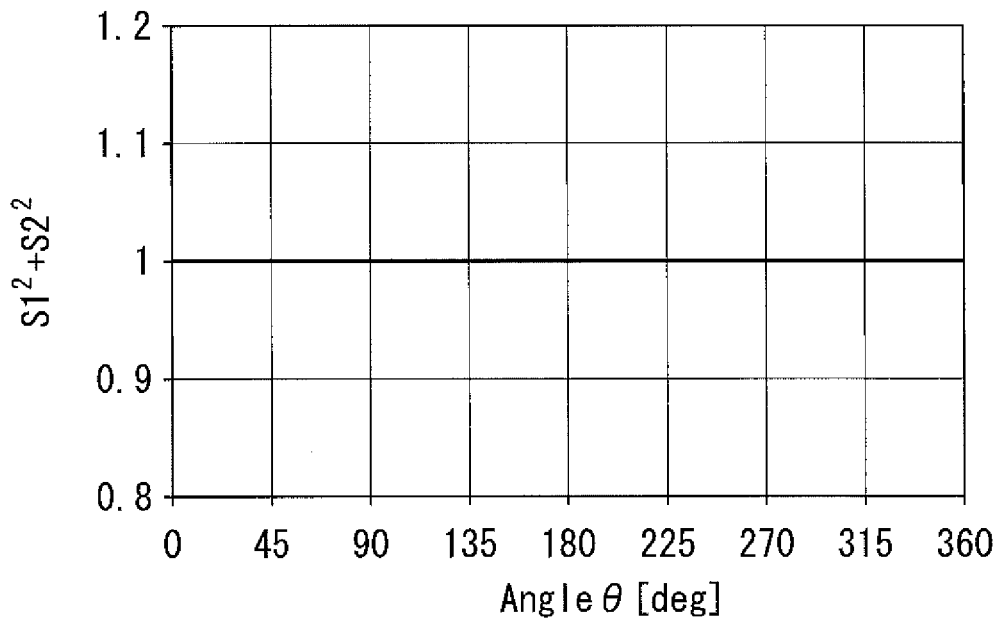
FIG. 9 is a waveform diagram illustrating the waveform of a square-sum signal when the angle-dependent error is the only error occurring in the detected angle value.

FIG. 9 illustrates the waveform of the square-sum signal in the case where the angle-dependent error θe is the only error occurring in the detected angle value θs. In FIG. 9, the horizontal axis represents the angle θ, and the vertical axis represents the value of the square-sum signal. As is clear from Equation (16) and FIG. 9, when the angle-dependent error θe is the only error occurring in the detected angle value θs, the value of the square-sum signal is constant regardless of the value of the angle θ. Thus, the angle-dependent error θe does not cause fluctuation in the magnitude of the square-sum signal. Both of the techniques disclosed in U.S. Patent Application Publication Nos. 2012/0095712 A1 and 2006/0076480 A1 relate to correction performed to reduce fluctuation in the magnitude of the square-sum signal. Thus, neither of these techniques can reduce the angle-dependent error θe.

In the present embodiment, the error estimate E having a correspondence with the difference between the uncorrected detected angle value θp and the ideal angle estimate θc is generated on the basis of the first and second signals S1 and S2, and correction information is determined on the basis of the generated error estimate E to perform correction processing the details of which are determined on the basis of the correction information. In the correction processing, the estimate Ep1 of the first error component S1c is subtracted from the first signal S1 before the correction processing to thereby generate the corrected first signal Sa1, and the estimate Ep2 of the second error component S2e is subtracted from the second signal S2 before the correction processing to thereby generate the corrected second signal Sa2. The variable component Ev of the error estimate E is thereby reduced. The variable component Ev expressed by Equation (4B) can be said to be an estimate of the angle-dependent error θe expressed by Equation (15). Thus, the present embodiment achieves a reduction in the angle-dependent error after the correction processing.

Figure 10:
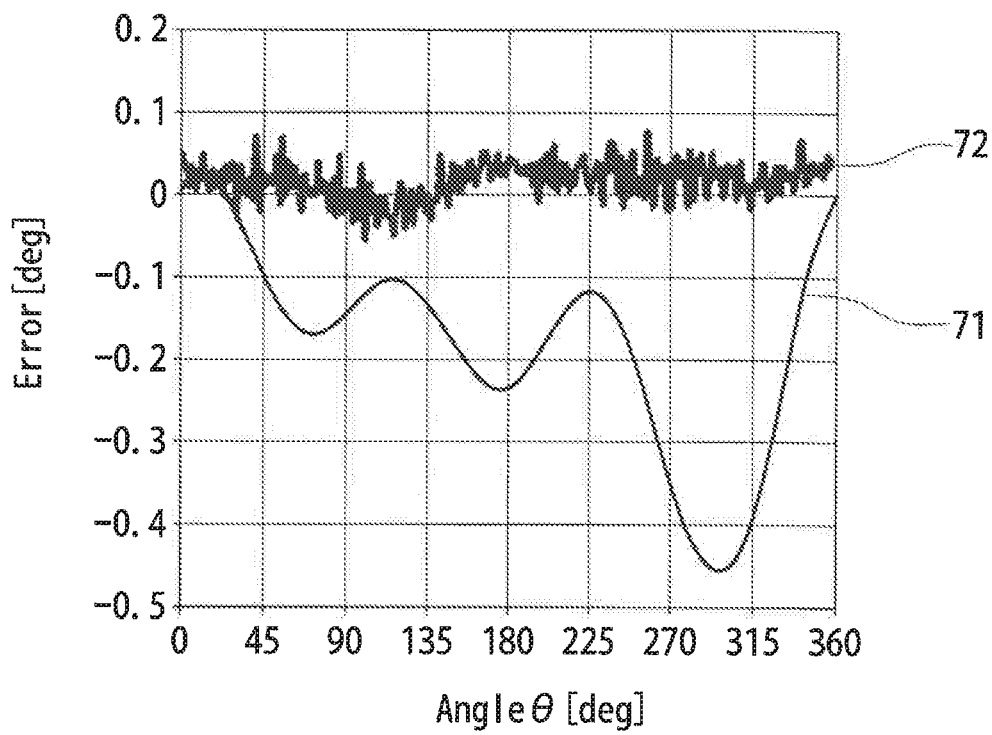
FIG. 10 is a waveform diagram illustrating the effect of the first embodiment of the invention.

FIG. 10 is a waveform diagram illustrating the effect of the present embodiment. In FIG. 10, the horizontal axis represents the angle θ to be detected. In FIG. 10, the vertical axis represents error that collectively represents both the error estimate E obtained in the first step S110 and the angle-dependent error in the detected angle value θs. In FIG. 10, the reference numeral 71 denotes one example of waveform of the error estimate E, and the reference numeral 72 denotes one example of waveform of the angle-dependent error in the detected angle value θs. It can be said that in the example illustrated in FIG. 10, the difference between the maximum value and the minimum value in the waveform of the error estimate E is an estimate of the difference between the maximum value and the minimum value in the angle-dependent error θe in the case where the correction processing is not performed. The value thereof is approximately 0.45°. In contrast, the difference between the maximum value and the minimum value in the waveform of the angle-dependent error in the detected angle value θs is approximately 0.13°. The present embodiment thus achieves a reduction in the angle-dependent error.

Second Embodiment

Figure 11:
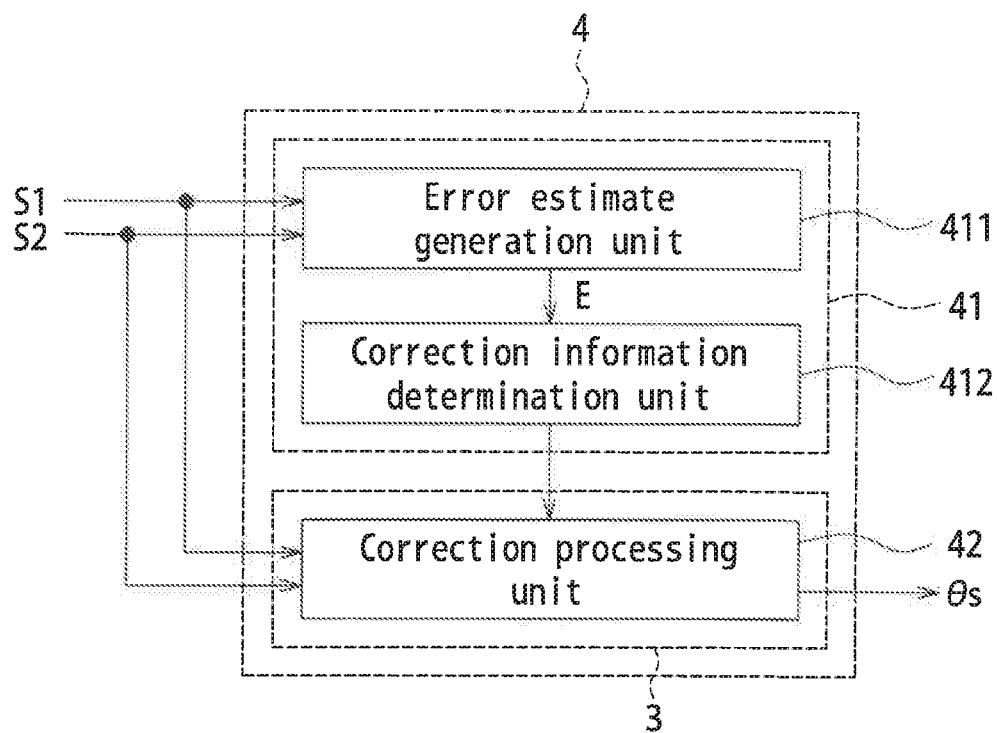
FIG. 11 is a functional block diagram illustrating the configuration of an angle detector and a correction apparatus of an angle sensor according to a second embodiment of the invention.

A second embodiment of the invention will now be described. First, the configuration of the angle detector 3 of the second embodiment will be described with reference to FIG. 11. FIG. 11 is a functional block diagram illustrating the angle detector 3 and the correction apparatus 4. Of the computing unit 31 and the correction processing unit 42 described in relation to the first embodiment, only the correction processing unit 42 is provided in the angle detector 3 of the second embodiment. The correction processing unit 42 is incorporated in the angle detector 3. As will be described later, in the second embodiment the computations for generating the detected angle value θs are performed by the correction processing unit 42.

Figure 12:
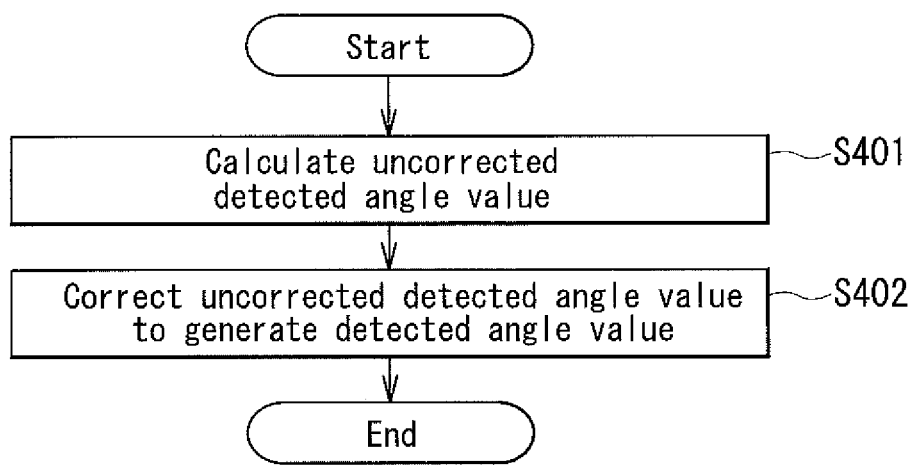
FIG. 12 is a flowchart of the step of performing correction processing in a correction method for the angle sensor according to the second embodiment of the invention.

Now, with reference to FIG. 11 and FIG. 12, a description will be given of the operations of the angle detector 3 and the correction apparatus 4 and the correction method for the angle sensor 1 according to the present embodiment. The correction method according to the present embodiment includes the step of performing correction processing the details of which are determined on the basis of correction information, instead of the step S200 of performing correction processing of the first embodiment. FIG. 12 is a flowchart of the step of performing correction processing.

In the correcting method according to the present embodiment, the step of generating the correction information is basically similar to that in the first embodiment described with reference to FIG. 6. However, in the present embodiment, the step S122 of determining the correction information is different from that in the first embodiment. In the present embodiment, the correction information is information that defines a waveform representing change in the variable component Ev of the error estimate E with respect to change in the ideal angle estimate θc. The variable component Ev is expressed by Equation (4B) presented previously. In the step S122 of determining the correction information, the amplitude $A_n$ and the phase $\alpha_n$ obtained in the step S121 of applying the Fourier transform illustrated in FIG. 6 are used as the correction information.

The step of performing the correction processing shown in FIG. 12 is executed by the correction processing unit 42 after the step S122 of determining the correction information. The step of performing the correction processing includes a step S401 of calculating the uncorrected detected angle value θp on the basis of the first and second signals S1 and S2, and a step S402 of generating the detected angle value θs by correcting the uncorrected detected angle value θp. The first and second signals S1 and S2 used at the correction processing unit 42 and in the step of performing the correction processing are those when the angle sensor 1 is in use.

In the step S401 of calculating the uncorrected detected angle value θp, the correction processing unit 42 calculates the uncorrected detected angle value θp on the basis of the first and second signals S1 and S2 by Equation (1) presented previously.

The following are first to third examples of the step S402 of generating the detected angle value θs. The first example of the step S402 will be described first. In the first example, before the step S402, a table indicating correspondence between the uncorrected detected angle value θp and the detected angle value θs is prepared in advance at specified angle intervals of the detected angle value θs on the basis of the correction information, i.e., the amplitude $A_n$ and phase $\alpha_n$ of the n-th order component of the error estimate E. The specified angle intervals may or may not coincide with ω·T in Equation (1) described in relation to the first embodiment. In the aforementioned table, the i-th corresponding θp and θs are denoted as θpa(i) and θsa(i), respectively, where i is an integer of 0 or more. Each of θpa(0) and θsa(0) takes a value of 0. The value of θsa(i) is in the range of 0° to less than 360°. The relationship between θpa(i) and θsa(i) is expressed by Equation (17) below.

$$\theta pa(i) = \theta sa(i) + Eva(i) \quad (17)$$

In Equation (17), Eva(i) is a value of Ev obtained by replacing the ideal angle estimate θc with θsa(i) in Equation (4B) presented previously.

When the angle sensor 1 is in use, the correction processing unit 42 obtains the detected angle value θs corresponding to the uncorrected detected angle value θp calculated in the step S401 by using linear interpolation on the basis of the aforementioned table. More specifically, the correction processing unit 42 obtains the detected angle value θs corresponding to the uncorrected detected angle value θp by using linear interpolation on the basis of θsa(i) corresponding to θpa(i) before and after the uncorrected detected angle value θp. When the uncorrected detected angle value θp matches with a specific θpa(i), the detected angle value θs is θsa(i) corresponding to the specific θpa(i). When θp is other than θpa(i), the detected angle value θs is a value estimated by linear interpolation.

Next, the second example of the step 402 will be described. In the second example, the correction processing unit 42 first obtains a correction value Cv corresponding to the uncorrected detected angle value θp by using the correction information, i.e., the amplitude $A_n$ and the phase $\alpha_n$ of the nth order component of the error estimate E. The correction value Cv is a value of Ev obtained by replacing the ideal angle estimate θc with θp in Equation (4B) presented previously. The correction processing unit 42 uses a value obtained by adding the correction value Cv to the uncorrected detected angle value θp as the detected angle value θs.

The value of Ev obtained by replacing the ideal angle estimate θc with θp in Equation (4B) and the value of Ev obtained from Equation (4B) on the basis of the ideal angle estimate θc differ very slightly from each other. Thus, the detected angle value θs obtained by the second example has sufficient precision.

Next, the third example of the step 402 will be described. In the third example, the correction processing unit 42 obtains the correction value Cv corresponding to the uncorrected detected angle value θp as in the second example. However, in the third example, the correction processing unit 42 obtains the correction value Cv by Equation (18) below. The right-hand side of Equation (18) is obtained by replacing the ideal angle estimate θc with θp in Equation (4B) presented previously, and further developing the same.

$$Cv = A_1\{\cos\theta p \cdot \cos\alpha_1 + \sin\theta p \cdot \sin\alpha_1\} + \qquad (18)$$
$$A_2\{\cos2\theta p \cdot \cos2\alpha_2 + \sin2\theta p \cdot \sin2\alpha_2\} +$$
$$A_3\{\cos3\theta p \cdot \cos3\alpha_3 + \sin3\theta p \cdot \sin3\alpha_3\} + \ldots$$

As described in relation to the first embodiment, cos θp and sin θp in the right-hand side of Equation (18) are a value of the first signal S1 before the correction processing and a value of the second signal S2 before the correction processing, respectively. The ter us of the second- or higher-order components in the right-hand side of Equation (18) are expressible using cos θp and sin θp. In the third example, the correction processing unit 42 calculates the correction value Cv by using the value cos θp of the first signal S1 before the correction processing, the value sin θp of the second signal S2 before the correction processing, and the amplitude $A_n$ and the phase $\alpha_n$ of a plurality of different n-th order components of the error estimate E. As a result, when calculating the detected angle value θs, it is possible to omit arithmetic calculation of the cosine function in the equation obtained by replacing the ideal angle estimate θc with θp in Equation (4B).

The other configuration, operation, and effects of the second embodiment are the same as those of the first embodiment.

The present invention is not limited to the foregoing embodiments, and various modifications may be made thereto. For example, in the angle sensor of the present invention, not only the correction processing for reducing the angle-dependent error by the correction apparatus of the present invention, but also additional correction processing for reducing an error other than the angle-dependent error occurring in the detected angle value may be performed. The additional correction processing may be processing for changing the detected angle value, which has been corrected by the correction processing that reduces the angle-dependent error, by a fixed value to thereby generate a new detected angle value.

The present invention is applicable not only to magnetic angle sensors but to all types of angle sensors including optical angle sensors.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A correction apparatus comprising:
    an angle sensor including:
        a signal generator for generating a first signal and a second signal each having a correspondence with an angle to be detected; and
        an angle detector for generating a detected angle value by performing computations using the first signal and the second signal, the detected angle value having a correspondence with the angle to be detected, when the angle to be detected varies with a predetermined period, the first signal contains a first ideal component and a first error component, and the second signal contains a second ideal component and a second error component, and the first ideal component and the second ideal component are different in phase from each other and vary periodically in such a manner as to trace an ideal sinusoidal curve;
    a correction information generator for generating correction information; and
    a correction processor for performing correction processing in a course of generation of the detected angle value by the angle detector, details of the correction processing being determined based on the correction information,
    wherein the correction processing is processing for bringing the detected angle value closer to an ideal angle estimate as compared with an uncorrected detected angle value, the ideal angle estimate corresponding to the detected angle value obtained when the first signal does not contain the first error component, the second signal does not contain the second error component and the correction processing is not performed, the uncorrected detected angle value corresponding to the detected angle value obtained when the correction processing is not performed,
    the correction information generator is a processor for performing:
        first processing of generating an error estimate based on the first signal and the second signal under a condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate; and
        second processing of determining the correction information based on the error estimate,
    the first processing includes processing of sequentially calculating the ideal angle estimate, the uncorrected detected angle value and the error estimate at specified time intervals T on an assumption that an angular velocity of change in the angle to be detected has a constant value, wherein the uncorrected detected angle value is calculated based on the first and second signals, and the error estimate is the difference between the uncorrected detected angle value and the ideal angle estimate,
    the processing of sequentially calculating the ideal angle estimate, the uncorrected detected angle value and the error estimate assumes that θp(0) represents a value of the uncorrected detected angle value at a point in time when the uncorrected detected angle value is calculated for the first time after the processing of sequentially calculating is started, and that θc(0) represents a value of the ideal angle estimate at the point in time when θp(0) is calculated, and then calculates θc(i) and E(i) as θc(i)=θc(i−1)+ω·T and E(i)=θp(i)−θc(i), respectively, where θc(i), θp(i), and E(i) respectively represent the ideal angle estimate, the uncorrected detected angle value, and the error estimate that are calculated at an i-th point in time after θp(0) is calculated, where i is an integer of 1 or more, and where w represents an estimate of the angular velocity of change in the angle to be detected, and
    the correction processing is processing for correcting the first and second signals.

2. The correction apparatus according to claim 1, wherein the angle to be detected is an angle that a direction of a rotating magnetic field in a reference position forms with respect to a reference direction.

3. The correction apparatus according to claim 1, wherein the first ideal component and the second ideal component are different in phase from each other by 90°.

4. The correction apparatus according to claim 1, wherein in the first processing, prior to the processing of sequentially calculating the ideal angle estimate, the uncorrected detected angle value and the error estimate, the uncorrected detected angle value is calculated sequentially at specified time intervals T, and an average of angular velocities of change in the uncorrected detected angle value is calculated to use the average as the estimate ω of the angular velocity of change in the angle to be detected.

5. The correction apparatus according to claim 1, wherein
the correction information includes first correction information and second correction information, the first correction information containing one or more coefficients among a plurality of coefficients provided to express the first error component as a Fourier series, the second correction information containing one or more coefficients among a plurality of coefficients provided to express the second error component as a Fourier series,
the second processing applies a Fourier transform to a waveform representing change in the error estimate with respect to change in the ideal angle estimate, and determines the first and second correction information based on a result thereof, and
in the correction processing, an estimate of the first error component and an estimate of the second error component are obtained using the first and second signals before the correction processing and the first and second correction information, the estimate of the first error component is subtracted from the first signal before the correction processing to thereby generate a corrected first signal, and the estimate of the second error component is subtracted from the second signal before the correction processing to thereby generate a corrected second signal.

6. A correction method comprising:
a step of providing an angle sensor including: a signal generator for generating a first signal and a second signal each having a correspondence with an angle to be detected; and an angle detector for generating a detected angle value by performing computations using the first signal and the second signal, the detected angle value having a correspondence with the angle to be detected, when the angle to be detected varies with a predetermined period, the first signal contains a first ideal component and a first error component, and the second signal contains a second ideal component and a second error component, and the first ideal component and the second ideal component are different in phase from each other and vary periodically in such a manner as to trace an ideal sinusoidal curve;
a step of generating correction information; and
a step of performing correction processing in a course of generation of the detected angle value by the angle detector, details of the correction processing being determined based on the correction information, wherein
the correction processing is processing for bringing the detected angle value closer to an ideal angle estimate as compared with an uncorrected detected angle value, the ideal angle estimate corresponding to the detected angle value obtained when the first signal does not contain the first error component, the second signal does not contain the second error component and the correction processing is not performed, the uncorrected detected angle value corresponding to the detected angle value obtained when the correction processing is not performed,
the step of generating the correction information includes:
a first step of generating an error estimate based on the first signal and the second signal under a condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate; and
a second step of determining the correction information based on the error estimate,
the first step includes performing processing of sequentially calculating the ideal angle estimate, the uncorrected detected angle value and the error estimate at specified time intervals T on an assumption that an angular velocity of change in the angle to be detected has a constant value, wherein the uncorrected detected angle value is calculated based on the first and second signals, and the error estimate is the difference between the uncorrected detected angle value and the ideal angle estimate,
the processing of sequentially calculating the ideal angle estimate, the uncorrected detected angle value and the error estimate assumes that $\theta p(0)$ represents a value of the uncorrected detected angle value at a point in time when the uncorrected detected angle value is calculated for the first time after the processing of sequentially calculating is started, and that $\theta c(0)$ represents a value of the ideal angle estimate at the point in time when $\theta p(0)$ is calculated, and then calculates $\theta c(i)$ and $E(i)$ as $\theta c(i)=\theta c(i-1)+\omega \cdot T$ and $E(i)=\theta p(i)-\theta c(i)$, respectively, where $\theta c(i)$, $\theta p(i)$, and $E(i)$ respectively represent the ideal angle estimate, the uncorrected detected angle value, and the error estimate that are calculated at an i-th point in time after $\theta p(0)$ is calculated, where i is an integer of 1 or more, and where w represents an estimate of the angular velocity of change in the angle to be detected, and
the correction processing is processing for correcting the first and second signals.

7. The correction method according to claim 6, wherein the angle to be detected is an angle that a direction of a rotating magnetic field in a reference position forms with respect to a reference direction.

8. The correction method according to claim 6, wherein the first ideal component and the second ideal component are different in phase from each other by 90°.

9. The correction method according to claim 6, wherein, in the first step, prior to performing the processing of sequentially calculating the ideal angle estimate, the uncorrected detected angle value and the error estimate, the uncorrected detected angle value is calculated sequentially at specified time intervals T, and an average of angular velocities of change in the uncorrected detected angle value is calculated to use the average as the estimate ω of the angular velocity of change in the angle to be detected.

10. The correction method according to claim 6, wherein
the correction information includes first correction information and second correction information, the first correction information containing one or more coefficients among a plurality of coefficients provided to express the first error component as a Fourier series, the second correction information containing one or more coefficients among a plurality of coefficients provided to express the second error component as a Fourier series,
in the second step, a Fourier transform is applied to a waveform representing change in the error estimate with respect to change in the ideal angle estimate, and the first and second correction information is determined based on a result thereof, and
in the correction processing, an estimate of the first error component and an estimate of the second error component are obtained using the first and second signals before the correction processing and the first and second correction information, the estimate of the first error component is subtracted from the first signal before the correction processing to thereby generate a corrected first signal, and the estimate of the second error component is subtracted from the second signal before the correction processing to thereby generate a corrected second signal.

11. An angle sensor comprising:
a signal generator for generating a first signal and a second signal each having a correspondence with an angle to be detected;
an angle detector for generating a detected angle value by performing computations using the first signal and the second signal, the detected angle value having a correspondence with the angle to be detected; and
a correction apparatus, wherein
when the angle to be detected varies with a predetermined period, the first signal contains a first ideal component and a first error component, and the second signal contains a second ideal component and a second error component,
the first ideal component and the second ideal component are different in phase from each other and vary periodically in such a manner as to trace an ideal sinusoidal curve,
the correction apparatus includes:
  a correction information generator for generating correction information; and
  a correction processor for performing correction processing in a course of generation of the detected angle value by the angle detector, details of the correction processing being determined based on the correction information,
the correction processing is processing for bringing the detected angle value closer to an ideal angle estimate as compared with an uncorrected detected angle value, the ideal angle estimate corresponding to the detected angle value obtained when the first signal does not contain the first error component, the second signal does not contain the second error component and the correction processing is not performed, the uncorrected detected angle value corresponding to the detected angle value obtained when the correction processing is not performed,
the correction information generator is a processor for performing:
  first processing of generating an error estimate based on the first signal and the second signal under a condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate; and
  second processing of determining the correction information based on the error estimate,
the first processing includes processing of sequentially calculating the ideal angle estimate, the uncorrected detected angle value and the error estimate at specified time intervals T on an assumption that an angular velocity of change in the angle to be detected has a constant value, wherein the uncorrected detected angle value is calculated based on the first and second signals, and the error estimate is the difference between the uncorrected detected angle value and the ideal angle estimate, and
the processing of sequentially calculating the ideal angle estimate, the uncorrected detected angle value and the error estimate assumes that $\theta p(0)$ represents a value of the uncorrected detected angle value at a point in time when the uncorrected detected angle value is calculated for the first time after the processing of sequentially calculating is started, and that $\theta c(0)$ represents a value of the ideal angle estimate at the point in time when $\theta p(0)$ is calculated, and then calculates $\theta c(i)$ and $E(i)$ as $\theta c(i)=\theta c(i-1)+\omega \cdot T$ and $E(i)=\theta p(i)-\theta c(i)$, respectively, where $\theta c(i)$, $\theta p(i)$, and $E(i)$ respectively represent the ideal angle estimate, the uncorrected detected angle value, and the error estimate that are calculated at an i-th point in time after $\theta p(0)$ is calculated, where i is an integer of 1 or more, and where w represents an estimate of the angular velocity of change in the angle to be detected.

12. The angle sensor according to claim 11, wherein
the angle to be detected is an angle that a direction of a rotating magnetic field in a reference position forms with respect to a reference direction,
the signal generator includes a first detection circuit for generating the first signal and a second detection circuit for generating the second signal, and
each of the first and second detection circuits includes at least one magnetic detection element for detecting the rotating magnetic field.

13. The angle sensor according to claim 12, wherein the at least one magnetic detection element is at least one magnetoresistance element including a magnetization pinned layer whose magnetization direction is pinned, a free layer whose magnetization direction varies depending on the direction of the rotating magnetic field, and a nonmagnetic layer located between the magnetization pinned layer and the free layer.

14. The angle sensor according to claim 11, wherein the first ideal component and the second ideal component are different in phase from each other by 90°.

15. The angle sensor according to claim 11, wherein in the first processing, prior to the processing of sequentially calculating the ideal angle estimate, the uncorrected detected angle value and the error estimate, the uncorrected detected angle value is calculated sequentially at specified time intervals T, and an average of angular velocities of change in the uncorrected detected angle value is calculated to use the average as the estimate ω of the angular velocity of change in the angle to be detected.

16. The angle sensor according to claim 11, wherein the correction processing is processing for correcting the first and second signals.

17. The angle sensor according to claim 16, wherein
the correction information includes first correction information and second correction information, the first correction information containing one or more coefficients among a plurality of coefficients provided to express the first error component as a Fourier series, the second correction information containing one or more coefficients among a plurality of coefficients provided to express the second error component as a Fourier series,
the second processing applies a Fourier transform to a waveform representing change in the error estimate with respect to change in the ideal angle estimate, and determines the first and second correction information based on a result thereof, and
in the correction processing, an estimate of the first error component and an estimate of the second error component are obtained using the first and second signals before the correction processing and the first and second correction information, the estimate of the first error component is subtracted from the first signal before the correction processing to thereby generate a corrected first signal, and the estimate of the second error component is subtracted from the second signal before the correction processing to thereby generate a corrected second signal.

18. The angle sensor according to claim 11, wherein the correction processing is processing for generating the detected angle value by calculating the uncorrected detected angle value based on the first and second signals and then correcting the uncorrected detected angle value.

19. The angle sensor according to claim 18, wherein
the correction information is information that defines a waveform representing change in the variable component of the error estimate with respect to change in the ideal angle estimate, and
the second processing applies a Fourier transform to a waveform representing change in the error estimate with respect to change in the ideal angle estimate, and determines the correction information based on a result thereof.

20. A correction apparatus comprising:
an angle sensor including: a signal generator for generating a first signal and a second signal each having a correspondence with an angle to be detected; and an angle detector for generating a detected angle value by performing computations using the first signal and the second signal, the detected angle value having a correspondence with the angle to be detected, wherein when the angle to be detected varies with a predetermined period, the first signal contains a first ideal component and a first error component, and the second signal contains a second ideal component and a second error component, and the first ideal component and the second ideal component are different in phase from each other and vary periodically in such a manner as to trace an ideal sinusoidal curve;
a correction information generator for generating correction information; and
a correction processor for performing correction processing in a course of generation of the detected angle value by the angle detector, details of the correction processing being determined based on the correction information,
wherein the correction processing is processing for bringing the detected angle value closer to an ideal angle estimate as compared with an uncorrected detected angle value, the ideal angle estimate corresponding to the detected angle value obtained when the first signal does not contain the first error component, the second signal does not contain the second error component and the correction processing is not performed, the uncorrected detected angle value corresponding to the detected angle value obtained when the correction processing is not performed,
the correction information generator is a processor for performing:
first processing of generating an error estimate based on the first signal and the second signal under a condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate; and
second processing of determining the correction information based on the error estimate,
the first processing includes processing of sequentially calculating the ideal angle estimate, the uncorrected detected angle value and the error estimate at specified time intervals T on an assumption that an angular velocity of change in the angle to be detected has a constant value, wherein the uncorrected detected angle value is calculated based on the first and second signals, and the error estimate is the difference between the uncorrected detected angle value and the ideal angle estimate,
the processing of sequentially calculating the ideal angle estimate, the uncorrected detected angle value and the error estimate assumes that $\theta p(0)$ represents a value of the uncorrected detected angle value at a point in time when the uncorrected detected angle value is calculated for the first time after the processing of sequentially calculating is started, and that $\theta c(0)$ represents a value of the ideal angle estimate at the point in time when $\theta p(0)$ is calculated, and then calculates $\theta c(i)$ and $E(i)$ as $\theta c(i)=\theta c(i-1)+\omega \cdot T$ and $E(i)=\theta p(i)-\theta c(i)$, respectively, where $\theta c(i)$, $\theta p(i)$, and $E(i)$ respectively represent the ideal angle estimate, the uncorrected detected angle value, and the error estimate that are calculated at an i-th point in time after $\theta p(0)$ is calculated, where i is an integer of 1 or more, and where w represents an estimate of the angular velocity of change in the angle to be detected, and
the correction processing is processing for generating the detected angle value by calculating the uncorrected detected angle value based on the first and second signals and then correcting the uncorrected detected angle value.

21. The correction apparatus according to claim 20, wherein the angle to be detected is an angle that a direction of a rotating magnetic field in a reference position forms with respect to a reference direction.

22. The correction apparatus according to claim 20, wherein the first ideal component and the second ideal component are different in phase from each other by 90°.

23. The correction apparatus according to claim 20, wherein in the first processing, prior to the processing of sequentially calculating the ideal angle estimate, the uncorrected detected angle value and the error estimate, the uncorrected detected angle value is calculated sequentially at specified time intervals T, and an average of angular velocities of change in the uncorrected detected angle value is calculated to use the average as the estimate ω of the angular velocity of change in the angle to be detected.

24. The correction apparatus according to claim 20, wherein
the correction information is information that defines a waveform representing change in the variable component of the error estimate with respect to change in the ideal angle estimate, and
the second processing applies a Fourier transform to a waveform representing change in the error estimate with respect to change in the ideal angle estimate, and determines the correction information based on a result thereof.

25. A correction method comprising:
a step of providing an angle sensor including: a signal generator for generating a first signal and a second signal each having a correspondence with an angle to be detected; and an angle detector for generating a detected angle value by performing computations using the first signal and the second signal, the detected angle value having a correspondence with the angle to be detected, when the angle to be detected varies with a predetermined period, the first signal contains a first ideal component and a first error component, and the second signal contains a second ideal component and a second error component, and the first ideal component and the second ideal component are different in phase from each other and vary periodically in such a manner as to trace an ideal sinusoidal curve;
a step of generating correction information; and
a step of performing correction processing in a course of generation of the detected angle value by the angle detector, details of the correction processing being determined based on the correction information,
wherein the correction processing is processing for bringing the detected angle value closer to an ideal angle estimate as compared with an uncorrected detected angle value, the ideal angle estimate corresponding to the detected angle value obtained when the first signal does not contain the first error component, the second signal does not contain the second error component and the correction processing is not performed, the uncorrected detected angle value corresponding to the detected angle value obtained when the correction processing is not performed,
the step of generating the correction information includes:
a first step of generating an error estimate based on the first signal and the second signal under a condition that the first signal varies over time to contain the first ideal component and the first error component and the second signal varies over time to contain the second ideal component and the second error component, the error estimate having a correspondence with a difference between the uncorrected detected angle value and the ideal angle estimate and containing a variable component that varies depending on the ideal angle estimate; and
a second step of determining the correction information based on the error estimate,
the first step includes performing processing of sequentially calculating the ideal angle estimate, the uncorrected detected angle value and the error estimate at specified time intervals T on an assumption that an angular velocity of change in the angle to be detected has a constant value, wherein the uncorrected detected angle value is calculated based on the first and second signals, and the error estimate is the difference between the uncorrected detected angle value and the ideal angle estimate,
the processing of sequentially calculating the ideal angle estimate, the uncorrected detected angle value and the error estimate assumes that θp(0) represents a value of the uncorrected detected angle value at a point in time when the uncorrected detected angle value is calculated for the first time after the processing of sequentially calculating is started, and that θc(0) represents a value of the ideal angle estimate at the point in time when θp(0) is calculated, and then calculates θc(i) and E(i) as θc(i)=θc(i−1)+ω·T and E(i)=θp(i)−θc(i), respectively, where θc(i), θp(i), and E(i) respectively represent the ideal angle estimate, the uncorrected detected angle value, and the error estimate that are calculated at an i-th point in time after θp(0) is calculated, where i is an integer of 1 or more, and where w represents an estimate of the angular velocity of change in the angle to be detected, and
the correction processing is processing for generating the detected angle value by calculating the uncorrected detected angle value based on the first and second signals and then correcting the uncorrected detected angle value.

26. The correction method according to claim 25, wherein the angle to be detected is an angle that a direction of a rotating magnetic field in a reference position forms with respect to a reference direction.

27. The correction method according to claim 25, wherein the first ideal component and the second ideal component are different in phase from each other by 90°.

28. The correction method according to claim 25, wherein, in the first step, prior to performing the processing of sequentially calculating the ideal angle estimate, the uncorrected detected angle value and the error estimate, the uncorrected detected angle value is calculated sequentially at specified time intervals T, and an average of angular velocities of change in the uncorrected detected angle value is calculated to use the average as the estimate ω of the angular velocity of change in the angle to be detected.

29. The correction method according to claim 25, wherein
the correction information is information that defines a waveform representing change in the variable component of the error estimate with respect to change in the ideal angle estimate, and
in the second step, a Fourier transform is applied to a waveform representing change in the error estimate with respect to change in the ideal angle estimate, and the correction information is determined based on a result thereof.

* * * * *